United States Patent
Blinderman

(10) Patent No.: US 12,385,360 B2
(45) Date of Patent: Aug. 12, 2025

(54) QUENCHING AND/OR SEQUESTERING PROCESS FLUIDS WITHIN UNDERGROUND CARBONACEOUS FORMATIONS, AND ASSOCIATED SYSTEMS AND METHODS

(71) Applicant: Ergo Exergy Technologies Inc., Montreal (CA)

(72) Inventor: Mikhail Blinderman, Montreal (CA)

(73) Assignee: ERGO EXERGY TECHNOLOGIES INC., Montreal (CA)

( * ) Notice: Subject to any disclaimer, the term of this patent is extended or adjusted under 35 U.S.C. 154(b) by 0 days.

(21) Appl. No.: 18/336,351

(22) Filed: Jun. 16, 2023

(65) Prior Publication Data
US 2024/0093577 A1    Mar. 21, 2024

Related U.S. Application Data

(60) Provisional application No. 63/376,434, filed on Sep. 20, 2022.

(51) Int. Cl.
*E21B 43/30*   (2006.01)
*E21B 41/00*   (2006.01)

(52) U.S. Cl.
CPC ................................ *E21B 41/0064* (2013.01)

(58) Field of Classification Search
CPC ...... E21B 43/006; E21B 43/243; E21B 43/30; E21B 36/04; E21B 43/28; E21B 43/2401; E21B 43/24; C10G 9/24; C10G 2300/4037
See application file for complete search history.

(56) References Cited

U.S. PATENT DOCUMENTS 2,718,263 A * 9/1955 Heilman .................. E21B 43/40
                                                    166/266
2,720,381 A * 10/1955 Quick ..................... E21B 37/00
                                                    175/205

(Continued)

FOREIGN PATENT DOCUMENTS

| CN | 106522914 | 3/2017 |
| CN | 208396699 | 1/2019 |

(Continued)

OTHER PUBLICATIONS

International Search Report and Written Opinion for International Patent Application No. PCT/IB23/56272, Applicant: Ergo Exergy Technologies, Inc., mailed Oct. 4, 2023, 12 pages.

(Continued)

*Primary Examiner* — Edwin J Toledo-Duran
(74) *Attorney, Agent, or Firm* — Perkins Coie LLP

(57) ABSTRACT

Methods and systems for quenching an underground carbonaceous formation with carbon and/or sequestering carbon within an underground carbonaceous formation are disclosed herein. In some embodiments, a representative coal gasification system can comprise (i) an injection conduit extending from a ground surface to an underground coal gasification (UCG) reaction region of a coal seam, (ii) a production conduit extending from a first underground region toward the ground surface, and (iii) an injection well fluidically coupled to a source of process fluid and extending toward a second underground region. The second underground region is laterally spaced apart from the first underground region by an adjacent formation having a hydraulic resistance higher than that of a first hydraulic resistance and a second hydraulic resistance.

16 Claims, 16 Drawing Sheets

(56) References Cited

U.S. PATENT DOCUMENTS

| | | | |
|---|---|---|---|
| 3,050,290 A * | 8/1962 | Caldwell | E21B 43/281 299/5 |
| 3,096,821 A * | 7/1963 | Dyes | E21B 43/16 166/401 |
| 3,113,620 A * | 12/1963 | Hemminger | E21B 43/2635 166/259 |
| 3,294,167 A * | 12/1966 | Vogel | E21B 43/24 166/306 |
| 3,379,260 A * | 4/1968 | O'Brien | B65G 5/00 405/59 |
| 3,409,077 A * | 11/1968 | Durie | E21B 43/243 166/272.3 |
| 3,438,203 A * | 4/1969 | Lamb | E21B 43/38 405/59 |
| 3,510,167 A * | 5/1970 | Carmody | E21B 43/28 299/4 |
| 3,581,821 A | 6/1971 | Ross | |
| 3,724,543 A * | 4/1973 | Bell | E21B 43/16 166/248 |
| 3,739,851 A * | 6/1973 | Beard | E21B 43/281 166/272.6 |
| 3,759,328 A * | 9/1973 | Ueber | E21B 43/281 166/272.6 |
| 3,759,329 A | 9/1973 | Ross | |
| 3,759,574 A * | 9/1973 | Beard | E21B 43/241 423/206.2 |
| 3,779,601 A * | 12/1973 | Beard | E21B 43/2405 166/272.2 |
| 3,782,465 A | 1/1974 | Bell | |
| 3,983,939 A | 10/1976 | Brown | |
| 3,998,492 A * | 12/1976 | Lambly | E21B 43/28 299/5 |
| 4,043,129 A | 8/1977 | McCabe | |
| 4,134,618 A * | 1/1979 | Kossack | E21B 43/28 299/5 |
| 4,161,218 A | 7/1979 | Varnon | |
| 4,161,983 A | 7/1979 | Schievelbein | |
| 4,232,902 A * | 11/1980 | Cuevas | E21C 41/20 299/5 |
| 4,239,287 A * | 12/1980 | Goldsmith | E21B 43/281 299/5 |
| 4,299,284 A | 11/1981 | Brown | |
| 4,399,866 A | 8/1983 | Dearth | |
| 4,456,065 A | 6/1984 | Heim | |
| 4,483,398 A | 11/1984 | Peters | |
| 4,687,058 A | 8/1987 | Casad | |
| 4,869,555 A | 9/1989 | Peters | |
| 5,043,149 A * | 8/1991 | Frint | C01D 7/126 23/302 T |
| 5,083,612 A | 1/1992 | Ashrawi | |
| 5,085,274 A | 2/1992 | Puri | |
| 5,262,134 A * | 11/1993 | Frint | C01D 7/14 23/302 T |
| 5,283,054 A * | 2/1994 | Copenhafer | C01D 7/35 299/5 |
| 5,287,926 A * | 2/1994 | Grupping | E21F 15/08 166/50 |
| 5,332,333 A | 7/1994 | Bentley | |
| 5,345,034 A | 9/1994 | Corey | |
| 5,439,054 A | 8/1995 | Chaback et al. | |
| 5,575,922 A * | 11/1996 | Green | C02F 1/66 423/209 |
| 5,609,838 A * | 3/1997 | Neuman | C01D 7/126 423/206.1 |
| 5,690,390 A * | 11/1997 | Bithell | E21B 43/28 299/5 |
| 5,730,550 A | 3/1998 | Andersland | |
| 5,766,270 A * | 6/1998 | Neuman | C01D 7/24 299/5 |
| 5,915,477 A | 6/1999 | Stuebinger | |
| 5,955,043 A * | 9/1999 | Neuman | C01D 7/35 23/302 T |
| 5,989,505 A * | 11/1999 | Zolotoochin | C01D 7/126 423/427 |
| 6,228,335 B1 * | 5/2001 | Copenhafer | C01D 7/126 423/421 |
| 6,279,660 B1 | 8/2001 | Hay | |
| 6,322,767 B1 * | 11/2001 | Neuman | E21B 43/28 423/421 |
| 6,408,249 B1 | 6/2002 | Teletzke | |
| 6,428,759 B1 * | 8/2002 | Smith | C01D 7/24 423/421 |
| 6,454,002 B1 | 9/2002 | Stokes | |
| 6,499,536 B1 | 12/2002 | Ellingsen | |
| 6,820,696 B2 | 11/2004 | Bergman | |
| 7,611,208 B2 * | 11/2009 | Day | E21B 33/12 299/5 |
| 7,980,312 B1 | 7/2011 | Hill | |
| 8,596,355 B2 | 12/2013 | Kaminsky | |
| 8,690,476 B2 * | 4/2014 | Oates | B65G 5/005 405/56 |
| 8,863,839 B2 | 10/2014 | Kaminsky | |
| 9,016,370 B2 * | 4/2015 | Daub | E21B 36/04 166/302 |
| 9,080,441 B2 | 7/2015 | Meurer | |
| 9,187,246 B2 | 11/2015 | Hoier | |
| 9,309,756 B1 | 4/2016 | Affholter | |
| 9,433,894 B2 * | 9/2016 | Niedringhaus | C01D 7/126 |
| 9,638,017 B2 * | 5/2017 | Detournay | E21B 43/28 |
| 9,644,466 B2 | 5/2017 | Symington | |
| 9,803,458 B2 * | 10/2017 | Bestgen | E21B 43/28 |
| 9,879,516 B2 * | 1/2018 | Hughes | E21B 43/30 |
| 10,059,600 B2 * | 8/2018 | Geniesse | C01D 7/24 |
| 10,202,830 B1 | 2/2019 | Griffin | |
| 10,253,610 B2 | 4/2019 | Roth | |
| 10,422,210 B1 * | 9/2019 | Day | C22B 26/10 |
| 11,125,069 B1 | 9/2021 | Blinderman | |
| 11,421,148 B1 * | 8/2022 | Al-Yousif | C09K 8/584 |
| 11,441,408 B2 | 9/2022 | Blinderman et al. | |
| 11,644,220 B1 * | 5/2023 | Marsh | F03G 4/026 165/45 |
| 2001/0025703 A1 * | 10/2001 | Blangetti | F28B 1/06 165/111 |
| 2002/0125011 A1 | 9/2002 | Snider | |
| 2003/0102123 A1 * | 6/2003 | Wittle | E21B 43/16 166/248 |
| 2003/0215941 A1 * | 11/2003 | Campbell | C12M 25/02 435/325 |
| 2005/0061396 A1 * | 3/2005 | Landry | F17C 7/04 62/50.2 |
| 2005/0199387 A1 * | 9/2005 | Wittle | E21B 43/2401 166/248 |
| 2006/0185851 A1 | 8/2006 | Grimshaw | |
| 2006/0237194 A1 * | 10/2006 | Donald | E21B 34/02 166/305.1 |
| 2006/0254765 A1 * | 11/2006 | Pfeiffer | E21B 43/25 166/252.3 |
| 2006/0254769 A1 * | 11/2006 | Wang | E21B 43/16 166/57 |
| 2007/0133960 A1 * | 6/2007 | Vinegar | C07C 4/02 392/301 |
| 2008/0207970 A1 * | 8/2008 | Meurer | E21B 41/0064 585/24 |
| 2008/0210423 A1 | 9/2008 | Boney | |
| 2009/0050319 A1 * | 2/2009 | Kaminsky | E21B 36/003 166/302 |
| 2009/0084545 A1 | 4/2009 | Banerjee | |
| 2009/0107669 A1 | 4/2009 | Elphick | |
| 2009/0145598 A1 * | 6/2009 | Symington | E21B 43/30 166/250.01 |
| 2009/0145843 A1 | 6/2009 | Ahner | |
| 2009/0188669 A1 | 7/2009 | Berg | |
| 2009/0229824 A1 | 9/2009 | Ocalan | |
| 2009/0230335 A1 | 9/2009 | Ocalan | |
| 2009/0242196 A1 | 10/2009 | Pao | |
| 2009/0253594 A1 | 10/2009 | Dalrymple | |
| 2010/0163226 A1 * | 7/2010 | Zornes | H01M 8/0612 166/268 |

(56) References Cited

U.S. PATENT DOCUMENTS

| | | | |
|---|---|---|---|
| 2010/0200229 A1* | 8/2010 | Jefferd | E21B 43/255 166/305.1 |
| 2010/0258309 A1* | 10/2010 | Ayodele | E21B 43/243 166/272.3 |
| 2010/0307759 A1 | 12/2010 | Berg | |
| 2011/0035154 A1* | 2/2011 | Kendall | C04B 28/10 422/111 |
| 2011/0036571 A1 | 2/2011 | Vitalievich | |
| 2011/0042069 A1 | 2/2011 | Bailey | |
| 2011/0083849 A1 | 4/2011 | Medvedev | |
| 2011/0087473 A1 | 4/2011 | Jimenez Chavez | |
| 2011/0120702 A1 | 5/2011 | Craig | |
| 2011/0146978 A1* | 6/2011 | Perlman | C10J 3/00 166/266 |
| 2011/0186295 A1 | 8/2011 | Kaminsky | |
| 2011/0198084 A1 | 8/2011 | Lockhart | |
| 2011/0220348 A1 | 9/2011 | Jin | |
| 2012/0125604 A1* | 5/2012 | Willingham | E21B 43/20 166/270.1 |
| 2012/0152534 A1* | 6/2012 | Troshko | E21B 43/40 166/268 |
| 2012/0273190 A1 | 11/2012 | Thomas | |
| 2013/0081804 A1 | 4/2013 | Sinha | |
| 2013/0090902 A1 | 4/2013 | Yao | |
| 2013/0105179 A1 | 5/2013 | Lieberman | |
| 2013/0170910 A1 | 7/2013 | Hoier | |
| 2013/0231867 A1 | 9/2013 | Lin | |
| 2013/0245952 A1 | 9/2013 | Lin | |
| 2013/0284020 A1* | 10/2013 | Geuzebroek | B01D 53/1493 95/183 |
| 2013/0336721 A1* | 12/2013 | McBride | F17C 1/007 405/55 |
| 2014/0034304 A1 | 2/2014 | Eisenschmid | |
| 2014/0054032 A1 | 2/2014 | Affholter | |
| 2014/0130498 A1* | 5/2014 | Randolph | F24T 10/20 166/267 |
| 2014/0182302 A1* | 7/2014 | Antoniono | F23R 3/286 60/726 |
| 2014/0305640 A1 | 10/2014 | Wellington | |
| 2014/0338921 A1* | 11/2014 | Barry | E21B 43/35 166/369 |
| 2014/0354032 A1 | 12/2014 | Haugen | |
| 2015/0010357 A1* | 1/2015 | De Koeijer | E21D 13/00 405/53 |
| 2015/0047832 A1 | 2/2015 | Yuan | |
| 2015/0053403 A1 | 2/2015 | Potapenko | |
| 2015/0107833 A1* | 4/2015 | Boone | E21B 43/2408 166/272.3 |
| 2015/0114636 A1* | 4/2015 | Pereira-Almao | E21B 43/34 166/272.2 |
| 2015/0125210 A1 | 5/2015 | Ingersoll | |
| 2015/0192002 A1 | 7/2015 | Rogers | |
| 2015/0204179 A1* | 7/2015 | Affholter | |
| 2015/0275644 A1 | 10/2015 | Chen | |
| 2016/0102538 A1 | 4/2016 | Murrell | |
| 2016/0154129 A1 | 6/2016 | Sayers | |
| 2017/0030180 A1 | 2/2017 | Maurer | |
| 2017/0145793 A1 | 5/2017 | Ouenes | |
| 2017/0167639 A1* | 6/2017 | Sridhar | H01M 8/0668 |
| 2018/0187533 A1 | 7/2018 | Al-Gouhi | |
| 2019/0062059 A1* | 2/2019 | Kwon | C07K 7/06 |
| 2019/0162060 A1 | 5/2019 | Randall | |
| 2019/0249074 A1* | 8/2019 | Rizq | E21B 33/138 |
| 2019/0265125 A1* | 8/2019 | Carter | F02K 3/00 |
| 2019/0266294 A1 | 8/2019 | Dogru | |
| 2020/0273592 A1 | 8/2020 | Crichlow | |
| 2021/0005338 A1 | 1/2021 | Crichlow | |
| 2021/0405247 A1 | 12/2021 | Badri | |
| 2022/0098965 A1 | 3/2022 | Morton | |
| 2022/0105464 A1 | 4/2022 | Holder | |
| 2022/0154563 A1 | 5/2022 | AlYousif | |
| 2022/0289486 A1* | 9/2022 | Hanks | C12N 1/12 |
| 2022/0298900 A1 | 9/2022 | Weiss | |
| 2022/0372854 A1 | 11/2022 | Mlinar | |
| 2022/0372859 A1* | 11/2022 | Blinderman | E21B 43/295 |
| 2023/0085175 A1 | 3/2023 | Smalls | |
| 2023/0296017 A1 | 9/2023 | Cardiff | |
| 2023/0368935 A1 | 11/2023 | Crichlow | |
| 2023/0392485 A1 | 12/2023 | Johnson | |
| 2024/0102372 A1 | 3/2024 | Dahi Taleghani | |

FOREIGN PATENT DOCUMENTS

| | | |
|---|---|---|
| EP | 2787164 A1 | 10/2014 |
| GB | 2088896 | 6/1982 |

OTHER PUBLICATIONS

International Search Authority, "International Search Report and the Written Opinion" for PCT Application No. PCT/US2021/040931, dated Nov. 10, 2021, 16 pages.

Non-Final Office Action mailed Feb. 8, 2022 in U.S. Appl. No. 17/456,130 for Blinderman et al., filed Nov. 22, 2021, 18 pages.

* cited by examiner

FIG. 18

QUENCHING AND/OR SEQUESTERING PROCESS FLUIDS WITHIN UNDERGROUND CARBONACEOUS FORMATIONS, AND ASSOCIATED SYSTEMS AND METHODS

CROSS-REFERENCE TO RELATED APPLICATION(S)

The present application claims the benefit of priority to U.S. Provisional Patent Application No. 63/376,434, filed Sep. 20, 2022, and is related to U.S. patent application Ser. No. 17/200,334, now U.S. Pat. No. 11,125,069, filed Mar. 12, 2021, the disclosures of which are incorporated herein by reference in their entireties.

TECHNICAL FIELD

The present disclosure relates to quenching an underground carbonaceous formation with process fluids, and/or sequestering process fluids within an underground carbonaceous formation. In some embodiments, the process fluids comprise carbon dioxide.

BACKGROUND

Underground coal gasification (UCG) is an industrial process in which coal or another carbon-containing mineral is used to generate a product gas at an underground carbonaceous formation. Generally, UCG involves supplying an oxidant and, if required, water and/or steam to an underground carbonaceous formation in order to ignite coal and sustain the gasification process. The oxidant and possibly other reagents are typically delivered to the underground carbonaceous formation via injection wells drilled from the surface. The gasification process generates product gases, which can then be brought to the surface using production wells drilled from the surface. The predominant product gases are hydrogen, carbon monoxide, methane, and carbon dioxide. Alternatively, mined shafts and associated workings can be used to inject the oxidant and/or produce the product gas. The resultant extracted product gas may be commercially used in a number of ways, e.g., as combustion fuel for power generation or as a chemical feedstock in the production of fuels, fertilizers, or other chemical products.

BRIEF DESCRIPTION OF THE DRAWINGS

Embodiments of the present disclosure will be described with reference to the appended drawings. However, various embodiments of the present disclosure are not limited to arrangements shown in the drawings.

FIG. 18 is a matrix of multiple categories that characterize methods and systems for effective sequestration of process fluids in an underground carbonaceous formation.

DETAILED DESCRIPTION

I. Overview

As described above, underground coal gasification (UCG) is a process in which one or more oxidants are injected into a carbonaceous formation (e.g., a coal seam) to promote an in situ gasification reaction. The gasification reaction produces a product gas, which can then be extracted and brought to the surface using one or more production wells extending from the carbonaceous formation to the surface. The product gases can comprise hydrogen, carbon monoxide, methane, and/or carbon dioxide, and are sometimes referred to as "syngas" or synthesis gas. The specific composition of the product gas can vary based on a number of factors, such as formation pressure, depth of the carbonaceous formation, oxidant balance, and gasification conditions.

Figure 1:
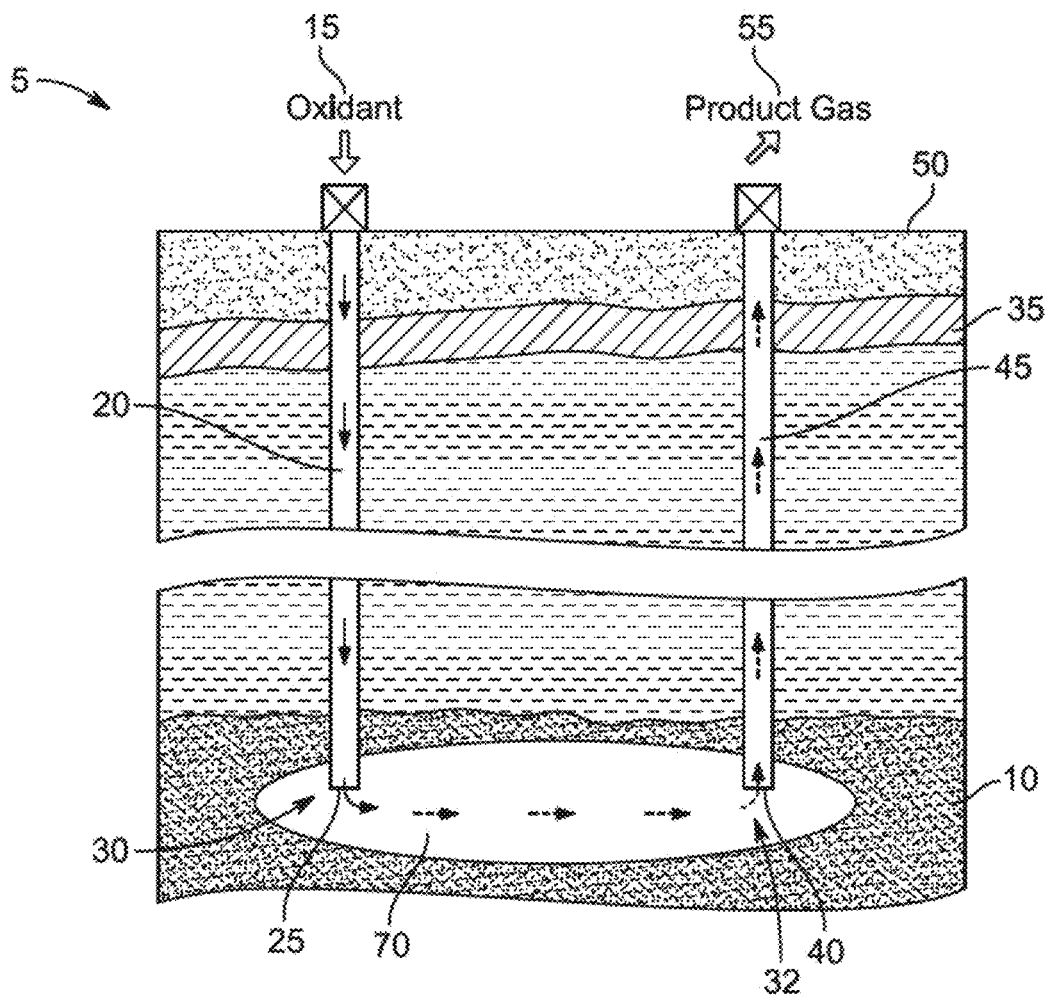
FIG. 1 is a schematic cross-sectional side view of an underground coal gasification system configured in accordance with the prior art.

FIG. 1 illustrates a UCG system 5. As shown in FIG. 1, the UCG system 5 includes an underground carbonaceous formation (UCF) 10 having a UCG reaction region 70, an injection well 20 extending from a surface 50 to the UCG reaction region 70, and a production well 45 extending from the UCG reaction region 70 to the surface 50. As used herein, the UCF can include any underground formation containing elemental carbon as part of a solid or liquid material that is largely immobile and may form either the matrix of the UCF's porous medium or the material that occupies the porous space of the matrix. The UCF 10 and/or the UCG reaction region 70 is located a distance (e.g., 100 meters (m) to 1600 m) below the surface 50, and is the site at which the in situ gasification reaction occurs. The injection well 20 can be configured to receive an oxidant (e.g., oxygen, air, or combinations thereof) and deliver it to the UCG reaction region 70, and the production well 45 can be configured to receive a product gas 55 (e.g., syngas) produced at the UCG reaction region 70 and deliver the product gas 55 to the surface 50, where the product gas 55 can undergo further processing and can be utilized as desired, e.g., to produce methanol or pure hydrogen gas. The product gas 55 can also be used to generate electricity, e.g., via a turbine. An end portion 25 of the injection well 20 can be positioned at a reaction region 30 of the UCG reaction region 70, and an end portion 40 of the production well 45 can be positioned at a production region 32 of the UCG reaction region 70. The distance between the end portion 25 of the injection well 20 and the end portion 40 of the production well 45 can be from 15 to 300 m, and can vary depending on various characteristics of the particular UCG reaction region 70.

An oxidant 15 can be supplied (e.g., pumped) from the surface 50 at a generally high pressure and/or ambient (or higher) temperature. In some embodiments, the oxidant 15 can have a temperature of from 700° C. to 1500° C. or any suitable value therebetween (e.g., 800° C., 900° C., 1000° C., 1200° C., 1400° C., etc.) at the UCG reaction region 70 over the course of the gasification reaction. In some embodiments, water may also be supplied via the injection well, e.g., in conjunction with the oxidant 15, and can enable the gasification reaction to produce more product gas 55. In some embodiments, the UCF 10 includes sufficient water, e.g., because it is located beneath a water table 35, and thus additional water does not need to be supplied via the injection well 20. In operation, the carbon of the UCF 10 is ignited and the gasification reaction is initiated, enabling the injected oxidant 15 and/or water to promote the in situ gasification reaction and produce the product gas 55.

As previously described, the product gas 55 can comprise a mixture of hydrogen, carbon monoxide, methane, and carbon dioxide. The product gas 55 is represented in simplified terms in Reaction 1 below as just hydrogen and carbon monoxide.

$$3C(s)+H_2O(g)+O_2(g) \rightarrow 3CO(g)+H_2(g) \quad \text{(Reaction 1)}$$

In practice, the product gas 55 produced via the gasification reaction flows toward the production region 32 and then to the surface 50 via the production well 45. The extracted product gas 55 may then be treated (e.g., purified) and/or undergo further processing depending on the desired end use or commercial application.

During the UCG process, a variety of organic and inorganic condensable by-products can be formed which may act as potential contaminants of groundwater in the surrounding UCF. Contaminants can include ammonia, phenol, inorganic contaminants, and/or hydrocarbons (e.g., C6 to C10 hydrocarbons), and can be captured within the product gas 55. During the UCG process, the flow and pressure of injected oxidant, as well as the flow and pressure of produced syngas, is regulated such that the operational pressure in the UCG reaction region 70 is lower than the hydrostatic pressure in the surrounding formation of the UCF 10. In doing so, a fluid pressure gradient exists in the formation that drives any formation fluids, including groundwater, into the UCG reaction region 70, and prevents gasification products from exiting into the formation. However, once the UCG reaction region 70 becomes depleted and a standard quality syngas can no longer be consistently sustained, the injection and production processes are ceased, the pressure gradient can no longer be controlled, and the contaminants may no longer be captured within the product gas. At that point, the pressure in the UCG reaction region 70 may equalize with or exceed the reservoir pressure and, as a result, any potential contaminants may escape into the formation. If, as has been general practice, the depleted panel is left to cool by natural phenomena in situ, including dissipation of heat by thermal conductivity and cooling by natural influx of groundwater, groundwater contamination of the underground environment can occur and can be very hard and expensive to clean up.

II. Rehabilitation of Depleted Underground Coal Gasification Panels and Associated Systems and Methods Embodiments of the present technology are directed to addressing the above-described issues by maintaining the pressure of the UCG reaction region 70 below the hydrostatic pressure, and/or cooling the UCG reaction region 70 to formation temperatures to inhibit further chemical reactions in the UCG reaction region 70 from occurring. During and following the process of cooling the UCG reaction region 70, the contaminants within the UCG reaction region 70 can be removed and delivered to the ground surface for cleanup and processing.

Figure 2:
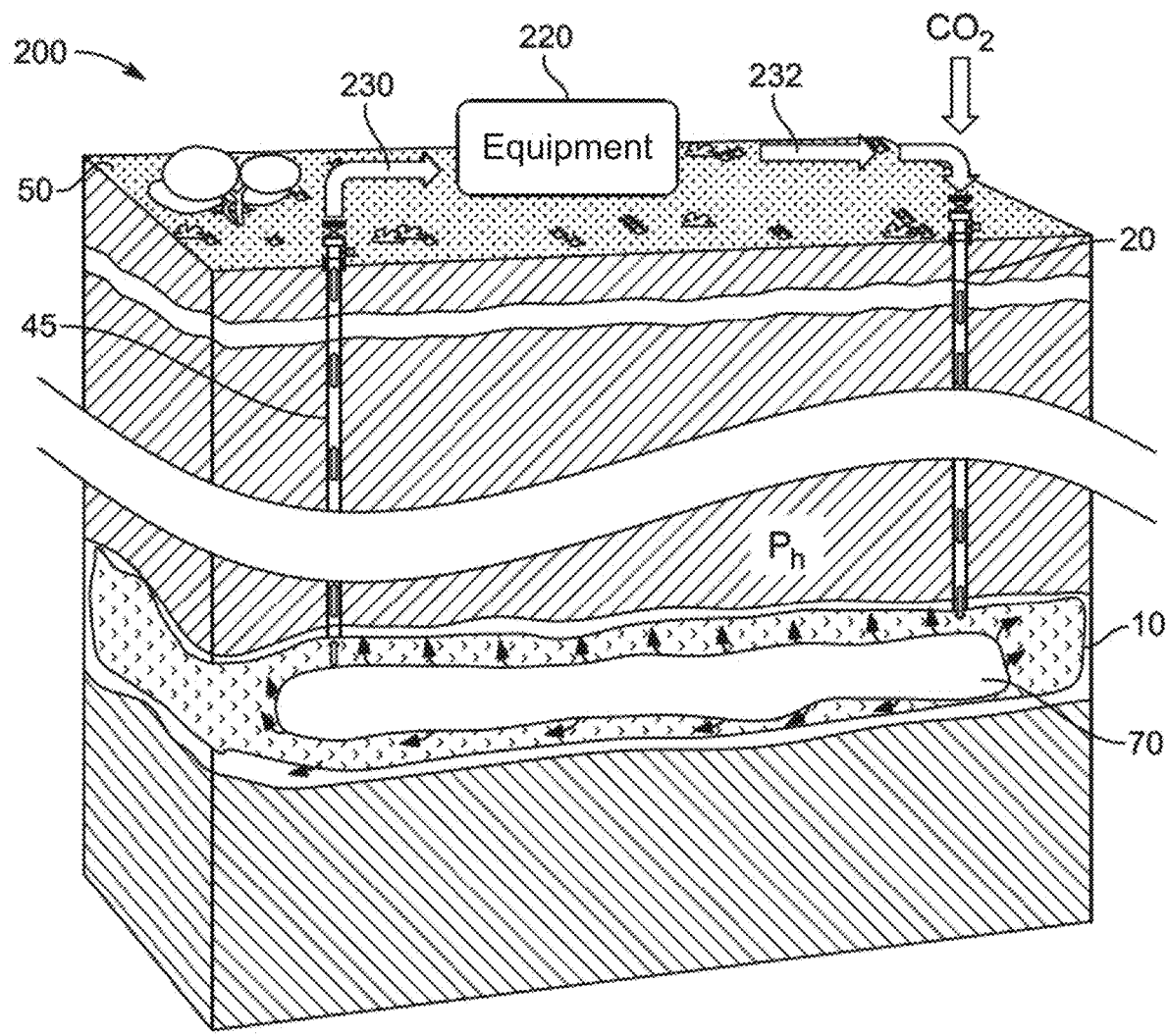
FIG. 2 is a schematic cross-sectional isometric view of a system for using an underground carbonaceous formation, in accordance with embodiments of the present technology.

FIG. 2 is a schematic cross-sectional isometric view of a system 200 for using an underground carbonaceous formation, and represents one embodiment for mitigating the above-described issues regarding groundwater contamination. The system 200 includes the UCF 10, injection well 20, production well 45, and UCG reaction region 70 described in FIG. 1, and further includes reconditioning equipment or a plant 220 ("equipment 220") fluidically coupled to the production well 45 and the injection well 20, which is configured to receive a process fluid. The process fluid can comprise a carbon-containing fluid, pure carbon dioxide fluid, at least 90% carbon dioxide fluid, flue gas, etc. It is noted that the system 200 can include additional conduits, valves, sensors, and/or controls (e.g., a controller) for regulating a flow of the process fluid through the system 200.

The equipment 220 can include a filter (e.g., a membrane) configured to separate contaminants and organic compounds from the process fluid, and/or a compressor configured to increase the pressure of the incoming stream from the production well 45. In embodiments including the compressor, the equipment 220 can include a segregation unit between the production well 45 and the inlet of the compressor configured to segregate (e.g., separate) syngas and process fluid traveling through the production well 45 from one another. The process fluid is pressurized, and/or can comprise carbon dioxide of various concentrations (e.g., at least 20%, 30%, 40%, 50%, 60%, 70%, 80%, 90%, 95%, or 99% carbon dioxide purity) and/or supercritical carbon dioxide. In such embodiments in which the carbon dioxide is supercritical, the injected carbon dioxide can have (i) a temperature of 10°-50° C. or no more than 50° C. or 70° C., and/or (ii) a pressure of at least 6 megapascals (MPa), 7 MPa, 8 MPa, 9 MPa, 10 MPa, 12 MPa, 14 MPa, 16 MPa, 18 MPa, or 20 MPa.

In some embodiments, an end portion of the injection well 20 is positioned at a bottom portion or lowest elevation of the UCG reaction region 70 (also referred to with respect to FIG. 2 as "the panel"). In doing so, the buoyancy of the injected process fluid (e.g., the carbon dioxide) enables the process fluid to rise through the UCG reaction region 70. Moreover, injecting the process fluid at the bottom portion of the UCG reaction region 70 enables the process fluid to entrain liquids (e.g., water and/or condensed contaminants) and carry them to the surface 50.

In operation, after the UCG reaction region 70 becomes depleted and/or syngas is no longer consistently being produced, the process fluid is injected via the injection well 20 toward the UCF 10. As the process fluid contacts the depleted panel, the process fluid heats and expands, thereby saturating the available free volume of the carbonaceous formation of the depleted panel and penetrating the pore space, cleat fractures, surrounding rock, ash, and/or slag. The process fluid dissolves the organic compounds present within the depleted panel and, as the process fluid is heated by the surrounding high temperature carbonaceous material, moves with a higher velocity through the depleted panel and production well 45 to produce a production fluid 230. As the production fluid 230 travels through the production well 45 and is received at the surface 50, it is cooled down (e.g., without using water), and is filtered and compressed via the equipment 220 to produce a cleaned injection process fluid 232 ("injection fluid 232"). The compression causes the partial pressure of vaporous contaminants to increase, which enables them to condense and be segregated from the injection fluid 232 (e.g., via gravity) along with other liquids and solids. The injection fluid 232 is reinjected into the panel via the injection well 20.

This process can be repeated until the panel is cooled via the injection fluid 232 to natural formation temperatures, and the production fluid 230 has contaminants below an acceptable level. As such, the end of the process can be determined by monitoring the temperature and/or contaminant levels of the production fluid 230. After the UCF 10 is cooled and the contaminant levels are determined to be below an acceptable level, the production well 45 can be closed and injection of the injection fluid 232 can continue until the pressure in the UCF 10 reaches or approaches lithostatic pressure (e.g., is within 5%, 10%, or 20% of lithostatic pressure) as measured or estimated at the relevant depth. The lithostatic pressure can be at least 20 bar gauge (barg), 30 barg, 50 barg, 100 barg, 150 barg, 200 barg, 250 barg, 300 barg, or 350 barg. Once pressure in the UCF 10 reaches or approaches lithostatic pressure, injection can cease and the injection well 20 can be "shut in." As the process fluid (e.g., carbon dioxide) from the UCF 10 diffuses into surrounding area, the pressure in the panel will slowly decay to reach hydrostatic and/or formation fluid pressure levels. Moreover, as the injection fluid 232 is adsorbed in the surrounding area to cause swelling, a low-permeability cocoon or region is formed and the environment is further protected from any material and/or contaminants that may remain in the UCG reaction region 70. Advantageously, embodiments of the present technology enable (i) all or a majority of contaminants to be removed from the UCF 10, and (ii) the UCF 10 to cool to or near ambient temperature. In doing so, components of the process fluid are sequestered, as described further below, and further coal conversion reactions are inhibited. Additionally, the likelihood of reignition, production of new organic compounds, and/or groundwater contamination is limited.

It is worth noting that utilizing the process fluid, as described herein, to cool down the UCG reaction region 70 has multiple advantages over utilizing other sources, such as water. For example, injecting water into the UCG reaction region 70 will produce steam, which is not an efficient solvent for most of the organic contaminants of the UCG process, as they are not hydrophilic. Additionally, because temperatures are not homogeneous throughout the UCG reaction region 70, injected water turns to steam only in hot parts of the UCG reaction region 70, and thus the cooler parts do not produce steam and contaminants there are not removed. As another example, once steam is formed, it can re-condense in cooler parts of the panel and in the production wells, resulting in ineffective removal of potential contaminants. As another example, separation of soluble organic products from water in a cleanup plant can be a complex and expensive process.

III. Sequestration of Process Fluid in Underground Carbonaceous Formations and Associated Systems and Methods Embodiments of the present technology enable the process fluid, which as described herein can include carbon-containing fluids, carbon dioxide-containing fluids, flue gas, etc., to be sequestered in UCFs. There are many types of carbon-containing gaseous fluids that are produced as a result of industrial processes and/or in the course of recovering and processing fossil fuels. The most common examples of such processes are flue gases produced from power generation plants, coal-fired boilers, natural gas turbines, diesel-fired turbines, reciprocating gas engines, cement plants, blast furnaces, refineries, and coking plants. Typical flue gases, e.g., from natural gas-fired power plants, can contain (mol/mol %) of 8%-10% carbon dioxide, 18%-20% water, 2%-3% oxygen, and 67%-72% nitrogen, and flue gases from coal-fired boilers can contain 12%-14% carbon dioxide, 8%-10% water, 3%-5% oxygen, and 72%-77% nitrogen. Other common examples of the carbon dioxide-containing fluids are effluents of sour gas separation plants, which separate sour gases (e.g., hydrogen sulfide and carbon dioxide) from natural gas and other industrial and naturally occurring streams. In such streams the share of carbon dioxide may reach 50%-85%.

In order to sequester process fluids and other greenhouse gases (GHGs) contained in the common industrial effluents, the GHGs are typically separated using one or more common gas fractionation processes that consume considerable amounts of energy and water, and have high capital and operational costs. As such, processing these industrial effluents via adsorption separation has not been economically practical. Other methods for segregating and sequestering the process fluid have included injecting the process fluid streams into carbonaceous formations to allow carbon of the formation to directly contact and adsorb carbon dioxide from the process fluid, while less readily adsorbing other components of the flue gas, such as nitrogen, that have less affinity for the carbon. More specifically, such methods required injecting a process fluid into a carbonaceous formation that included methane, to cause the methane to desorb from the carbon and be recovered via a production well, so that economic value of the recovered methane could offset the cost of establishing and operating the flue gas injection system. However, these methods have multiple deficiencies. For example, the volume and surface area of the carbonaceous formation that can be accessed via the injection and production wells is limited by the diameters of the wells and the distance at which the production well can hydraulically communicate with an injection well. As another example, the limited access to the formation in turn limits the level of penetration through the formation that the injected flue gas can reach, and thus limits the amount of carbon dioxide that can be stored. As another example, injectivity and the spread of flue gas within UCFs are severely limited by a significant reduction of formation permeability that results from the swelling of formation material caused by carbon dioxide adsorption. As a result, the injection of flue gas into the formation can be very short-lived and generally ineffective. Still further, this process is energy negative and requires a substantial external energy source, e.g., for compression and injection of the flue gas. As described herein, embodiments of the present technology can address these deficiencies.

Figure 3:
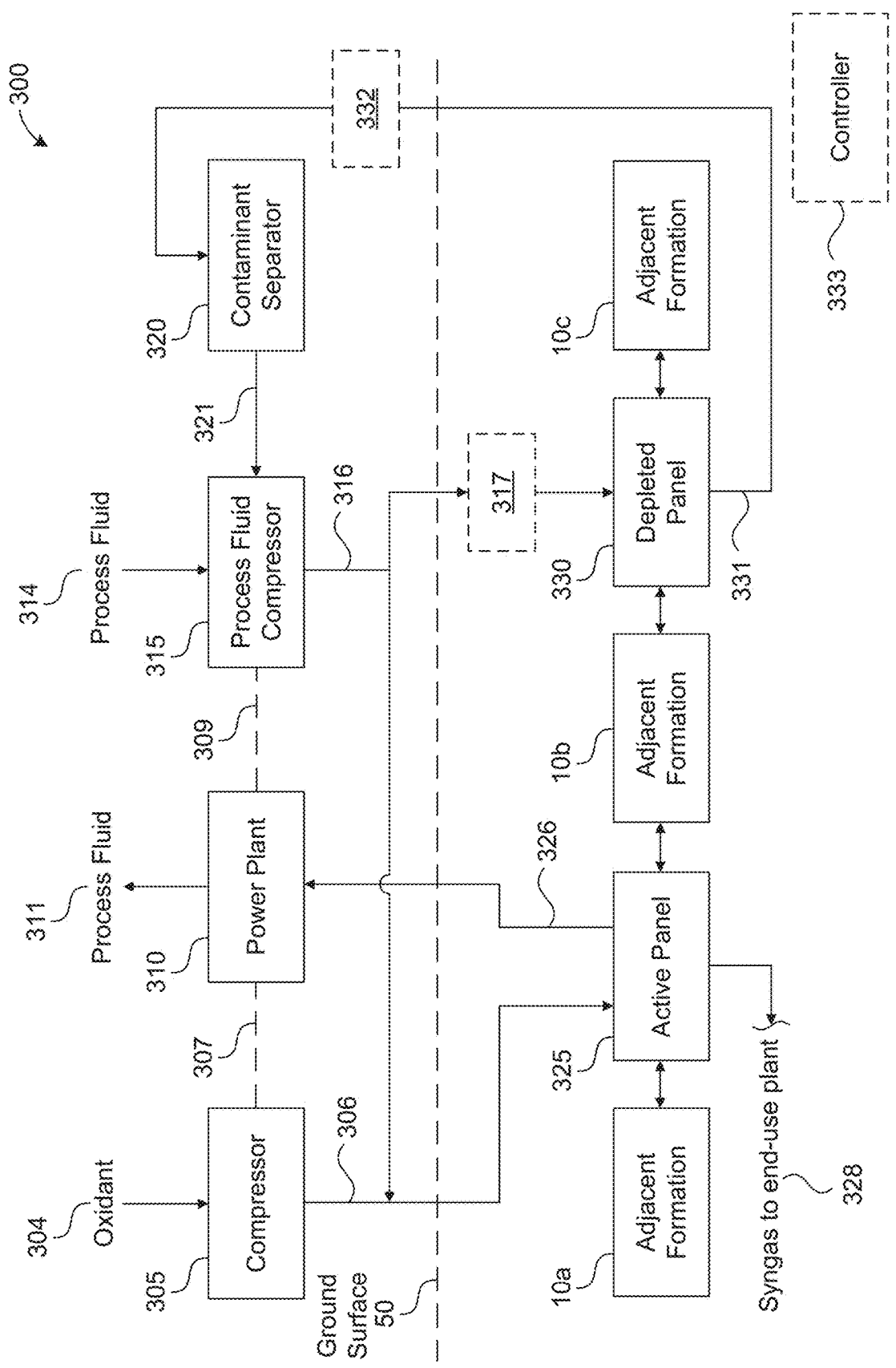
FIG. 3 is a schematic block diagram of a system for underground coal gasification and carbon sequestration, in accordance with embodiments of the present technology.

FIG. 3 is a schematic block diagram of a system 300 for UCG and carbon sequestration, in accordance with embodiments of the present technology. The system 300 includes processing equipment located above a surface 50 and carbonaceous formations beneath the surface 50. The processing equipment includes an oxidant compressor 305, a power plant 310, and a process fluid compressor 315 configured to compress a process fluid 314 (e.g., the process fluid described with reference to FIG. 2). In such embodiments, the oxidant compressor 305 and the power plant 310 can be electrically coupled to one another via a first electrical coupling 307, and the power plant 310 and the process fluid compressor 315 can be electrically coupled to one another via a second electrical coupling 309. The UCF can include an active panel 325, a depleted panel 330 spaced apart from the active panel 325, and adjacent (or intermediate) formations 10a/b/c (collectively referred to as "adjacent formations 10"). Gasification reactions generally do not occur at the adjacent formations 10, which have a higher hydraulic resistance than that of the active panel 325 and the depleted panel 330. In some embodiments, the depleted panel 330 has a higher hydraulic resistance than that of the active panel 325. The adjacent formations can correspond to the UCF, and can include a first adjacent formation 10a on a first side of the active panel 325, a second adjacent formation 10b on a second opposing side of the active panel 325 and a first side of the depleted panel 330, and a third adjacent formation 10c on a second opposing side of the depleted panel 330. The UCF can include coal, tar sands, peat, carbonaceous shale, oil shale, and/or a depleted oil/gas field.

The oxidant compressor 305 is configured to receive and pressurize an oxidant 304 (e.g., the oxidant 15 of FIG. 1), and is fluidically coupled to the active panel 325 via an injection conduit 306. In some embodiments, the oxidant compressor 305 can be part of an air separation unit or other plant/facility. The active panel 325 can produce, via UCG, a product gas stream (e.g., the product gas 55 of FIG. 1) comprising syngas via Reaction 1 described above. The product gas stream can be routed to (i) a desired end use, e.g., for further processing to produce hydrogen, methanol, or other chemicals/products, and (ii) the power plant 310 via an active panel production conduit 326. In some embodiments, the active panel 325 corresponds to the UCG system 5 of FIG. 1.

The power plant 310 is configured to generate a power output from the product gas stream received via the active panel production conduit 326. The power plant 310 can comprise a gas turbine, steam turbine, boiler, gas engine, and/or other equipment configured to generate a power output from the product gas stream received from the active panel 325. In some embodiments, the power output from the power plant 310 can offset the power expenditures of the overall system 300 and, in such embodiments, enable the system 300 to carry out an energy neutral or energy positive operation. For example, the power output from the power plant 310 can offset power requirements of the oxidant compressor 305, the process fluid compressor 315, etc. The power plant 310 can produce a process fluid 311 (e.g., carbon-containing fluid, pure carbon dioxide fluid, fluid comprising at least 90% carbon dioxide, flue gas, etc.), which as described herein can be sequestered within the UCF and/or utilized to quench or clean areas of the UCF.

The process fluid compressor 315 is configured to receive the process fluid 314 and produce a pressurized process fluid. The pressurized process fluid can comprise carbon dioxide of various concentrations (e.g., at least 20%, 30%, 40%, 50%, 60%, 70%, 80%, 90%, 95%, or 99% carbon dioxide purity), and/or supercritical carbon dioxide. The process fluid compressor 315 can be fluidically coupled to the depleted panel 330 via a depleted panel injection well 316, and to the active panel 325 via the active panel injection conduit 306. In some embodiments, the depleted panel 330 is a previous "active panel" that includes a UCF in which some or all of the volatile matter has been removed and/or production of a standard quality syngas can no longer be consistently sustained. In such embodiments, the depleted panel injection well 316 can correspond to the injection conduit previously drilled for the active panel. In operation, the pressurized process fluid provided to the depleted panel 330 can cool and remove (e.g., displace) contaminants from the carbonaceous formation of the depleted panel 330, as described with reference to FIG. 2, and produce a depleted panel production fluid. The depleted panel production fluid can comprise carbon dioxide and contaminants (e.g., ammonia, hydrocarbons, and other organic compounds) from the depleted panel 330, and can be recycled to the process fluid compressor 315 via a depleted panel production well 331. In some embodiments, the system 300 can further comprise a vacuum pump operably coupled to the depleted panel production well 331, e.g., such that the pressure of the depleted panel 330 can be negative (e.g., −0.99 barg).

The system 300 can further comprise a contaminant separator 320 that is fluidically coupled to the depleted panel production well 331 and process fluid compressor 315, and that is configured to separate the contaminants from the carbon dioxide and produce a separator outlet fluid that is directed to the process fluid compressor 315. The depleted panel 330 can have a cross-sectional dimension (e.g., diameter) of at least 0.5 m, 1 m, 5 m, 10 m, 50 m, 100 m, 200 m, or within a range of 0.5-200 m. In some embodiments, the cross-sectional dimension of the depleted panel injection well 316 is the same as or has a similar cross-sectional dimension to that of the injection conduit 306 and/or production conduit 326.

In operation, the depleted panel injection fluid is directed to the depleted panel 330 and then is compressed, via the process fluid compressor 315, to be temporarily recycled back to the depleted panel 330, as was described with reference to FIG. 2. For example, as the depleted panel injection fluid (e.g., carbon dioxide of the depleted panel injection fluid) contacts the depleted panel 330 and surrounding UCF, the depleted panel injection fluid heats and expands, thereby saturating the available free volume of the UCF of the depleted panel 330 and penetrating the pore space, cleat fractures, surrounding rock, ash, and/or slag thereof. The carbon dioxide dissolves the organic compounds present within the depleted panel 330, and as carbon dioxide is heated by the surrounding high temperature carbonaceous material, moves with a higher velocity through the depleted panel 330 to produce the depleted panel production fluid. As the depleted panel production fluid travels through the depleted panel production well 331 and is received at the surface 50, the contaminants are separated via the contaminant separator 320 and the remaining fluid is compressed via the process fluid compressor 315 to produce the depleted panel injection fluid, which is directed back to the depleted panel 330 via the depleted panel injection well 316.

The process fluid 314 directed through the depleted panel injection well 316 can have a pressure (e.g., can be injected at or be compressed to a pressure) at or approaching the lithostatic pressure at the depleted panel 330. For example, the pressure of the process fluid 314 injected into the depleted panel injection well 316 can be at least 10 barg, 20 barg, 30 barg, 40 barg, 50 barg, 100 barg, 150 barg, 200 barg, 250 barg, 300 barg, or 350 barg. In operation, while fluid is being injected via the depleted panel injection well 316 and/or withdrawn via the depleted panel production well 331, the depleted panel 330 can have an operating pressure of −0.99 barg up to 99% of the pressure of the process fluid 314 traveling through the depleted panel injection well 316.

As described with reference to FIG. 2, this process can be repeated until the depleted panel 330 is sufficiently quenched or cooled via the depleted panel injection fluid to natural formation temperatures, and the depleted panel production fluid has contaminants below an acceptable level. As such, the end of the process can be determined by monitoring the temperature and/or contaminant levels of the depleted panel production fluid. After the depleted panel 330 is cooled and the contaminant levels are determined to be below an acceptable level, the production well 45 can be closed and injection of the injection fluid 232 can continue until the pressure in the depleted panel 330 reaches or approaches lithostatic pressure. At that point, injection of the depleted panel injection fluid can cease. As carbon dioxide from the depleted panel 330 diffuses into the surrounding area, the pressure in the depleted panel 330 will slowly decay to reach hydrostatic pressure levels. Moreover, as the depleted panel injection fluid is adsorbed in the surrounding area, a low-permeability cocoon or region is formed and the environment is further protected from any material and/or contaminants that may remain. As described herein, in some embodiments the depleted panel may be further utilized as a "low pressure zone" for controlling migration of carbon-containing fluids with the UCF. In operation, adsorption of the pressurized process fluid in the UCF can cause desorption of methane, which can be directed toward the active panel 325 where it can be used as a gasification reagent.

During the above-described operation, the active panel 325 is generally maintained at a pressure below the formation pressure of the adjacent formations 10 and/or the UCF, and the depleted panel 330 is maintained at a pressure above the UCF pressure. Operating the system 300 in such a manner forms a pressure gradient within the UCF, with the depleted panel operating at the highest relative pressure, the active panel operating at the lowest relative pressure, and the adjacent formations operating at a pressure between that of the depleted panel and the active panel. In some embodiments, the operating pressure of the depleted panel and/or the injection pressure of the depleted panel injection fluid is maintained above the UCF pressure and lower than the lithostatic pressure within the UCF. Lithostatic pressure is based on a weight of formation overlying the reaction region or UCF. Since permeability through the UCF increases with injection fluid pressure, preferably the depleted panel pressure can be maintained less than but close to lithostatic pressure (e.g., within 40%, 30%, 20%, 10%, or 5% of the lithostatic pressure). Additionally, while adsorption of carbon dioxide grows with injection pressure when the pressure is relatively low, adsorption decreases with pressure when the pressure is relatively high. Therefore, maintaining the injection pressure close to lithostatic pressure can (i) increase permeability and enable the injected carbon dioxide to contact more remote areas of the UCF away from the boundaries of the depleted panel, and (ii) reduce adsorption of carbon dioxide in the UCF zones close to the boundaries of the depleted panel. In doing so, adsorption of the depleted panel injection fluid within the UCF around the depleted panel 330 is relatively low and the depleted panel injection fluid can spread throughout the UCF and enable deeper UCF penetration, as opposed to remaining close to boundaries of the depleted panel 330.

The temperature of the depleted panel 330 relative to adjacent formations 10 can beneficially promote desirable adsorption of the process fluid 314. Since the depleted panel 330 and adjacent formations 10 thereto have elevated temperatures relative to that of the UCF more remote from the depleted panel 330, and given that adsorption generally decreases as temperature of the process fluid 314 increases, injecting the process fluid 314 through the depleted panel 330 can beneficially improve adsorption. That is, as the process fluid 314 penetrates deeper into the UCF, the temperature of the process fluid 314 is reduced and approaches ambient, which thereby increases its adsorption. As such, in relation to quenching, it is beneficial to (1) reduce contaminants within a panel or area to acceptable levels, (2) "shut in" the production well, and (3) keep injecting process fluid at high pressure so that it is injected into surrounding formation while the temperature of the depleted panel 330 is still higher than that of surrounding areas of the UCF. In some embodiments, the depleted panel injection fluid is injected into the depleted panel 330, via the depleted panel injection well 316, at maximum flow rates (e.g., at least 5 tonnes per hour (tph), 10 tph, 50 tph, or 100 tph), until the injection pressure reaches lithostatic pressure in the UCF. Doing so can help maintain the depleted panel injection fluid at a maximum possible pressure throughout its injection, and can maximize its permeability through the UCF. As the depleted panel injection fluid spreads from the depleted panel 330 to the surrounding UCF, the pressure in the depleted panel gradually decreases. The pressure is replenished by additional injection fluid from the process fluid compressor 315 and depleted panel injection well 316, such that the pressure in the depleted panel is kept close to lithostatic pressure for the duration of the injection process until injection into the depleted panel 330 becomes ineffective. In some embodiments, the injection pressure is increased relatively slowly (e.g., over a period greater than 60 minutes) to inhibit cracking of the UCF and enable the process fluid to inflate fractures in the general area of the depleted panel 330 and/or UCF. This type of injection can be referred to as "matrix injection." Additionally or alternatively, the injection pressure is increased rapidly to inject the process fluid at maximum pressures and flow rates for a time period until a sufficient amount of constituents (e.g., the carbon dioxide) of the process fluid is injected. In such embodiments, carbon dioxide concentrates within the general area of the depleted panel 330, and then dissipates over time to surrounding areas.

Additionally or alternatively to injecting the depleted panel injection fluid at maximum possible flow rates, the flow and pressure of the injected gas can be varied. Since carbon dioxide adsorption within the UCF surrounding the depleted panel 330 can cause the carbonaceous materials thereof to swell, over time the permeability of the UCF around the depleted panel 330 can decrease. Intermittently adjusting (e.g., sharply increasing) the flow and pressure of the depleted panel injection fluid can combat this undesirable effect, by enabling the injected fluid to break through the "swollen" area of the UCF and allow the depleted panel injection fluid to reach and contact surrounding areas. As an example, sharp increases in the flow and/or pressure of the injected gas in a pulsed manner can help promote migration and deep penetration of the injected gas. For example, the injection flow can be increased from the formation fluid pressure to the lithostatic pressure in no more than 10 minutes, 20 minutes, 30 minutes, or 60 minutes.

The system 300 can further comprise a controller or control system 333 ("controller 333") and one or more sensors 332 (e.g., temperature sensors, pressure sensors, and/or contaminant sensors) in communication with the controller 333. The controller 333 is used to control, and is in communication with, different elements of the system 300. For example, the controller 333 can control the injection pressure of the active panel injection fluid and the depleted panel injection fluid. The controller 333 allows operators to control aspects of the system 300 from a remote location. Many embodiments of the controller 333 and/or technology described below may take the form of computer-executable instructions, including routines executed by a programmable computer. The controller 333 may, for example, also include a combination of supervisory control and data acquisition (SCADA) systems, distributed control systems (DCSs), programmable logic controllers (PLCs), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured, or constructed to perform one or more of the computer-executable instructions described below. Accordingly, the terms "controller" and "computer" as generally used herein refer to any data processor.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

The one or more sensors can be fluidically coupled to the depleted panel production well 331 and positioned to detect parameters of the depleted panel production fluid. In some embodiments, the sensors 332 are used to determine whether the depleted panel production fluid is below an acceptable level of contaminants and/or is below a predetermined temperature. In doing so, the sensors 332 can determine whether the depleted panel production fluid needs to be recycled or can be shut in. For example, after the depleted panel 330 is cooled and the contaminants within the depleted panel production fluid are determined to be below the acceptable level, the depleted panel 330 can be closed and injection to the depleted panel 330 can continue until the pressure in the depleted panel 330 reaches or approaches lithostatic pressure (e.g., within 5%, 10%, or 20% of lithostatic pressure). At that point, injection can cease. The system 300 can further comprise a pressure sensor 317 fluidically coupled to the depleted panel injection well 316 and configured to monitor the pressure of the depleted panel injection fluid. The pressure sensor 317 can determine whether the pressure in the depleted panel 330 reaches or approaches lithostatic pressure. Additionally, as the process fluid 314 dissipates into the surrounding UCF and the pressure in the depleted panel 330 decreases, more of the process fluid 314 can be injected into the depleted panel 330 using the pressure sensor 317, e.g., to maintain flow of the process fluid into the UCF.

The adjacent formations 10 positioned on opposing sides of the active panel 325 and the depleted panel 330 can be utilized to form pressure profiles within the UCF to drive a migration of the depleted panel injection fluid through the UCF in a controlled manner. For example, the adjacent formations 10 can be utilized to drive the injection fluid away from the depleted panel 330, which is at a pressure higher than the formation pressure of the UCF, and/or toward the active panel 325, which is at a pressure lower than the formation pressure of the UCF.

Figure 4:
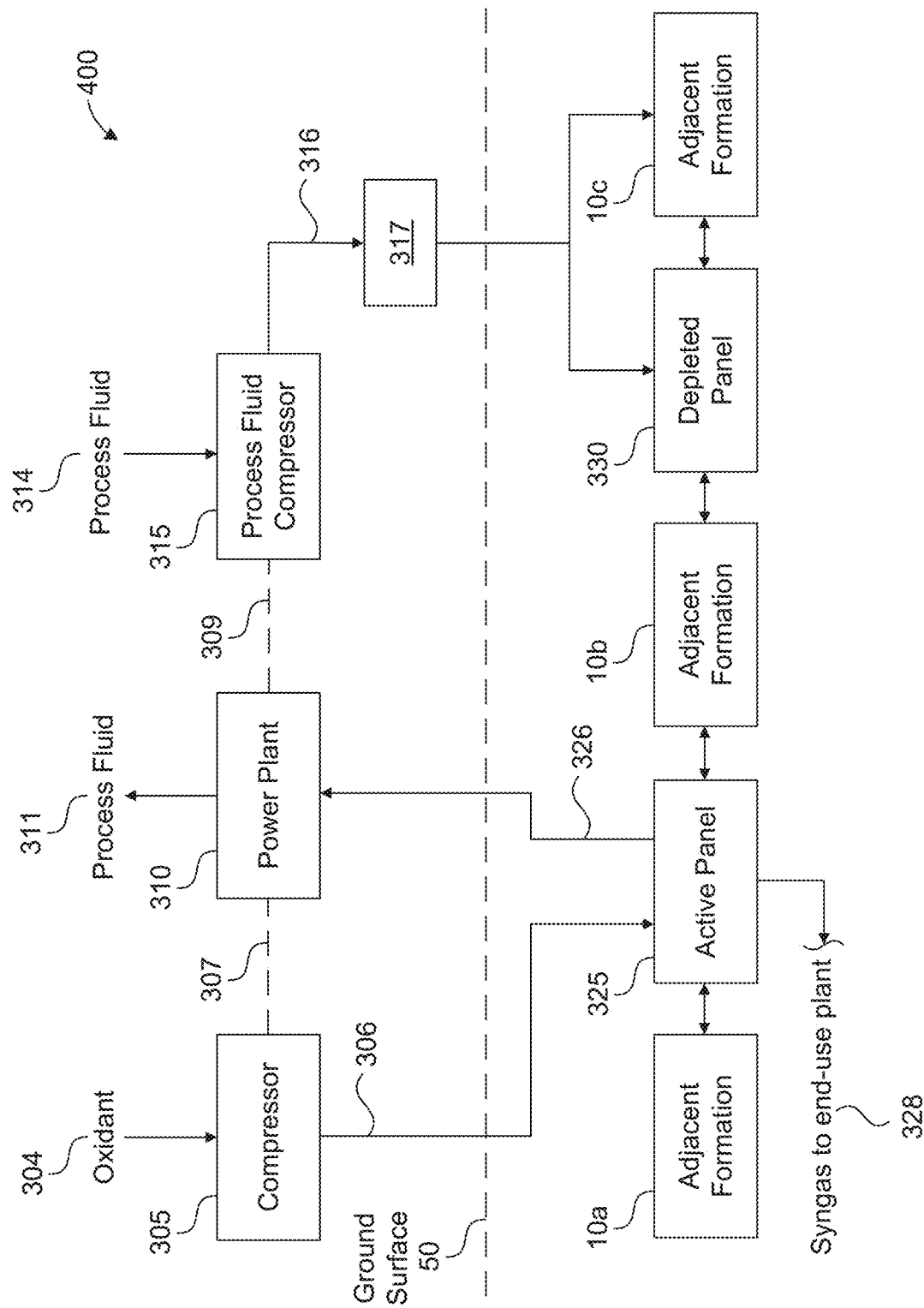
FIG. 4 is a schematic block diagram of another system for underground coal gasification and carbon sequestration, in accordance with embodiments of the present technology.

FIG. 4 is a schematic block diagram of another system 400 for UCG and carbon sequestration, in accordance with embodiments of the present technology. The system 400 includes many of the same (or generally similar) features and components of the system 300, including the oxidant compressor 305, the power plant 310, the process fluid compressor 315, the active panel 325, the depleted panel 330, and the adjacent formations 10. In some embodiments, the depleted panel 330 of the system 400 has been cleaned and/or cooled, as described with reference to the system 300 and FIG. 3, and is thus ready to receive carbon dioxide to be sequestered.

As shown in FIG. 4, the system 400 omits the depleted panel production well 331 of the system 300 (e.g., since the depleted panel 330 is already "cleaned"), and the depleted panel injection well 316 of the system 400 includes a first branch directed to the depleted panel 330 and a second branch directed to the adjacent formation 10c. The injection fluid provided from the process fluid compressor 315 can be directed to one or both of the depleted panel 330 and the adjacent formation 10c to form a desired pressure profile within that area of the UCF. For example, as previously described, in some embodiments a depleted panel may have previously been an active panel that now includes a UCF in which volatile matter has been removed and/or production of a standard quality syngas can no longer be consistently sustained. When the now depleted panel was an active panel producing syngas, it was operated at a pressure below the formation pressure of the surrounding UCF. In such embodiments, the injection fluid comprising carbon dioxide (e.g., supercritical carbon dioxide) could advantageously have been injected into the adjacent formation 10c at a pressure higher than that of the then active panel, and thereby form a desired pressure profile to drive migration of the injection fluid from the adjacent formation 10c, and through the surrounding UCF toward the then active panel. In doing so, carbon dioxide of the injection fluid could be adsorbed by the surrounding UCF. Once the active panel no longer produces syngas and has undergone the procedure described with reference to FIG. 3 (in which the depleted panel 330 is devoid of potential contaminants (i.e., "cleaned") and is at the formation temperature (i.e., "cooled")), the depleted panel 330 can then be utilized for the reasons described with reference to FIG. 3 and the system 300.

An example used to demonstrate whether UCG can be effective and efficient in building and running the system 400 is provided herein to determine: whether the system 400 can sustain this operation, what amount of energy is needed, and whether it is feasible to build and operate the system 400. In this example, the UCF comprises a 10 m thick sub-bituminous coal seam at a depth of 1.5 kilometers, and carbon dioxide must be sequestered at a rate of 1,000,000 tonnes per annum (tpa). For this example, it is assumed that (i) the process fluid 314 is pure carbon dioxide at the UCG site at an ambient temperature of 15° C. and at atmospheric pressure, and (ii) carbon dioxide is injected at steady-state conditions with a constant flow rate and at a pressure of 150 barg. Modeling an intercooled compressor with a fin-fan cooler compressing 1,000,000 tpa of carbon dioxide, performed using the Thermoflex software package, determined a total power requirement of 12.4 megawatts (MW). It is assumed that this power is generated by an integrated gasification combined cycle (IGCC) power plant fired by UCG syngas. If the system runs on air injection, it has to produce syngas at the energy rate of approximately 90 gigajoules per hour. The Thermoflex modeling of an intercooled air compressor gives the air injection power requirement at approximately 1.5 MW, resulting in a total plant power consumption of 13.9 MW. A detailed modeling of the UCG-IGCC process shows that the UCG panel necessary to provide energy for this process can be 1,500 m long and merely 2 m wide. Assuming that the IGCC plant runs without carbon dioxide capture, the overall carbon dioxide emissions of the described carbon dioxide sequestration plant equal approximately 73,000 tpa, meaning the plant sustains a net carbon dioxide sequestration of 927,000 tpa. That is, the process has negative carbon balance of −92.7%. According to embodiments of the present technology, these 1,000,000 tpa of carbon dioxide have to be injected through a same-size, already depleted UCG panel nearby, the resulting balance of carbon dioxide storage being as follows: 3.5% of carbon dioxide is stored within the depleted panel while 96.5% saturates surrounding adjacent formations on either side of the panel. The sufficient width of each adjacent formation in this case is 150 m.

UCG using air injection is a well-established process, and construction and operation of a 1.5 km long panel is a technically feasible task. By building and operating multiple panels, the scale of carbon dioxide sequestration can be easily scaled. For example, a typical 350 MW coal-fired power plant emits approximately 3,000,000 tpa of carbon dioxide. Sequestration of this much carbon dioxide requires running a 3-panel UCG-IGCC plant, similar to that described above.

Figure 5:
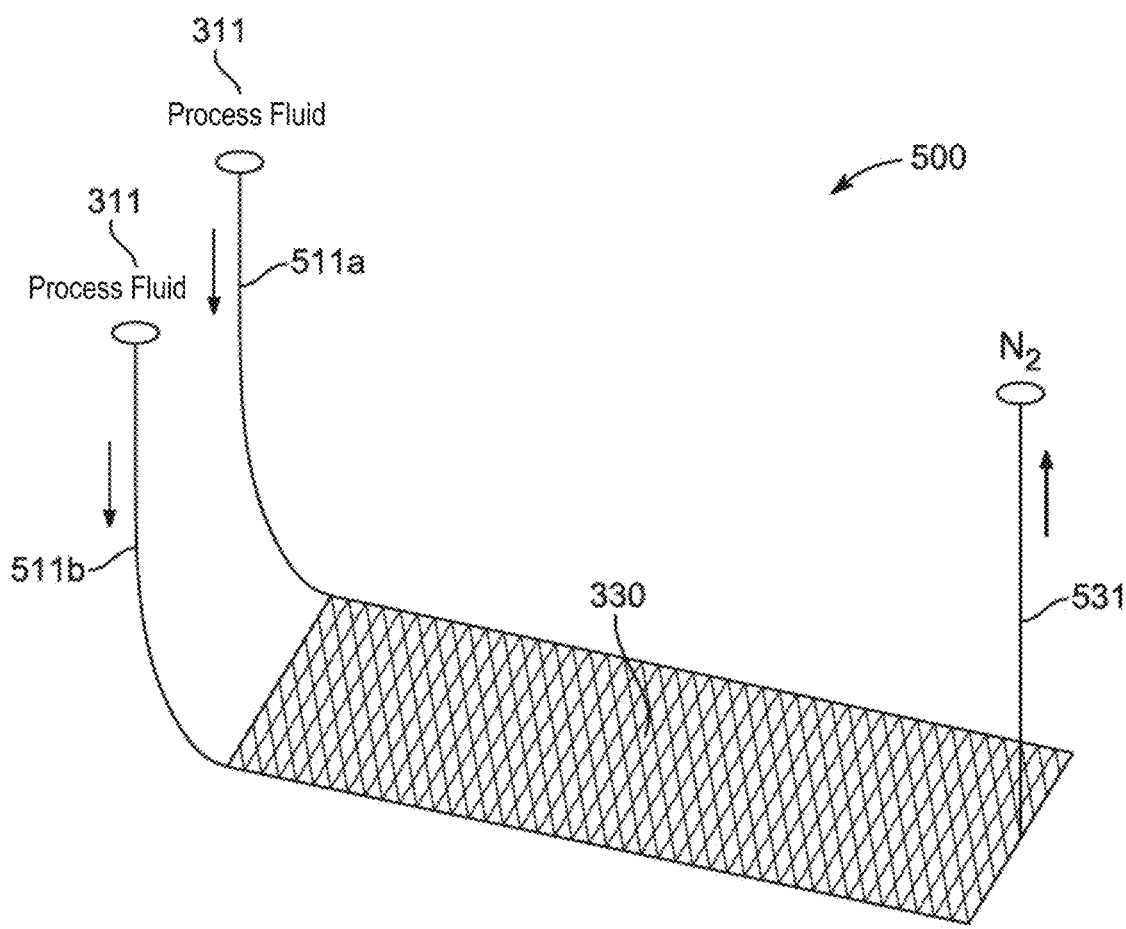
FIG. 5 is a schematic isometric view of a system for sequestering a process fluid, in accordance with embodiments of the present technology.

FIG. 5 is a schematic isometric view of a system 500 for sequestering a process fluid, as described herein, in accordance with embodiments of the present technology. For example, the term "process fluid" can correspond to any fluid having carbon dioxide content of at least 5%, including any flue gas from an industrial facility (e.g., a natural gas power plant, coal-fired boiler, etc.) and/or any carbon dioxide-containing effluent (e.g., from sour gas separation plants).

As shown in FIG. 5, the system 500 includes (i) depleted panel injection conduits 511a/b (collectively referred to as "depleted panel injection conduits 511") configured to direct the process fluid 311 to the carbonaceous formation of the depleted panel 330, as previously described with reference to FIG. 3, and (ii) a depleted panel production conduit 531 configured to direct a depleted panel production fluid comprising nitrogen away from the depleted panel 330. The depleted panel 330, or UCFs generally, has a higher adsorption affinity for carbon dioxide than nitrogen, and as such adsorbs more of the carbon dioxide than the nitrogen from the process fluid 311. As described herein, the depleted panel production fluid can be recycled through the depleted panel 330, e.g., to (i) adsorb carbon dioxide from the process fluid 311, (ii) disaggregate carbon dioxide and nitrogen from the process fluid 311, and/or (iii) produce purified nitrogen. This ability to treat the process fluid 311 is due at least in part to (i) the relatively large cross-sectional dimension of the depleted panel 330, (ii) the relatively high surface contact area of the injected process fluid 311 to the UCF, and/or (iii) the devolatilized nature of the depleted panel 330, which has a higher adsorptive capacity relative to an active panel or undepleted UCF area. The depleted panel 330 shown in FIG. 5 can have a length of at least 100 m, 300 m, 500 m, 1000 m, or 1500 m and a width, less than the length, of not more than 50 m, 100 m, 150 m, 200 m, 250 m, or 300 m.

Figure 6:
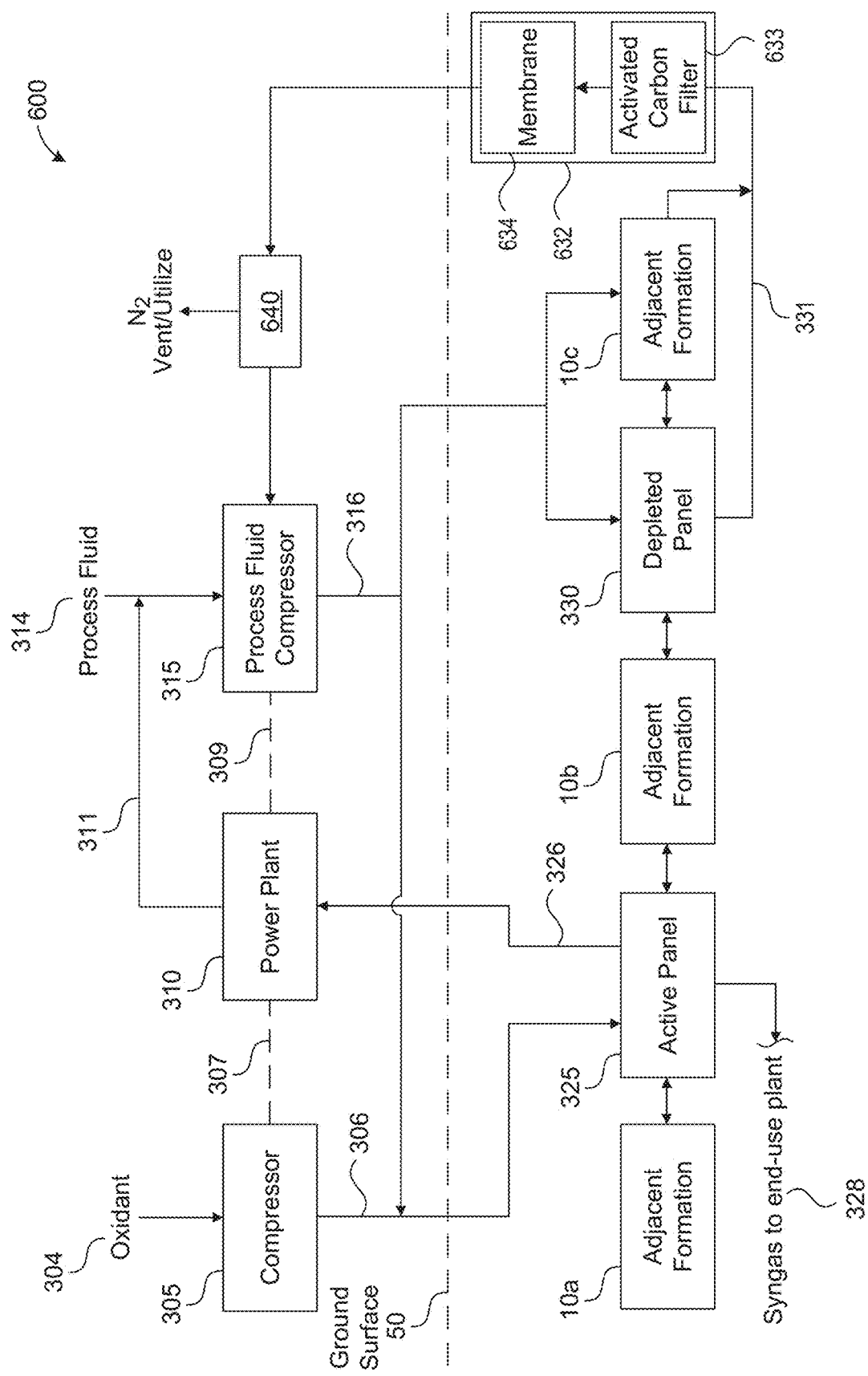
FIG. 6 is a schematic block diagram of another system for underground coal gasification and carbon sequestration, in accordance with embodiments of the present technology.

FIG. 6 is a schematic block diagram of another system 600 for UCG and carbon sequestration, in accordance with embodiments of the present technology. The system 600 includes many features previously described, including the oxidant compressor 305, power plant 310, process fluid compressor 315, active panel 325, depleted panel 330, and adjacent formations 10. As shown in FIG. 6, the process fluid 314, and/or the process fluid 311 from the power plant 310, is received by the process fluid compressor 315 and directed to the depleted panel 330 via the depleted panel injection well 316. The process fluid 311/314 can also be directed to the active panel 325 and the adjacent formation 10c. In doing so, any carbon and/or oxygen in the process fluid 311/314 can be utilized within the active panel 325, and the composition of the process fluid 311 can be improved and/or unified. The process fluid 311/314 directed to the depleted panel 330 passes through a carbonaceous formation that has a higher adsorption affinity for carbon dioxide than nitrogen, and as such adsorbs more of the carbon dioxide than the nitrogen from the process fluid 311/314. The depleted panel 330 production fluid that exits the depleted panel 330 thus has a higher concentration of nitrogen than that of the process fluid 311/314 provided to the depleted panel 330. The depleted panel production fluid can be recycled and recompressed via the process fluid compressor 315 until a sufficient amount of carbon dioxide is removed from the process fluid 311/314 and/or the depleted panel 330 becomes saturated.

The system 600 can further comprise a segregation system 632 (e.g., a nitrogen separation system) fluidically coupled to the depleted panel production well 331. The segregation system 632 is configured to segregate or remove carbon dioxide from the depleted panel production fluid exiting the depleted panel, while not removing nitrogen, to produce a nitrogen-enriched fluid exiting the segregation system 632 and proceeding toward the surface 50. The segregation system 632 can include an activated carbon filter 633 and/or a membrane 634 that is more permeable to nitrogen than carbon dioxide. The system 600 can further comprise one or more sensors 640 (e.g., nitrogen sensors) that are fluidically coupled to the segregation system 632 and that determine whether the nitrogen purity of the depleted panel production fluid is above acceptable levels. If the concentration of nitrogen in the production fluid is above the acceptable levels, it can be directed to a nitrogen vent or be utilized as a product for sale or distribution. If the production fluid is below the acceptable levels, it can be recycled back to the depleted panel 330 for further processing.

Figure 7:
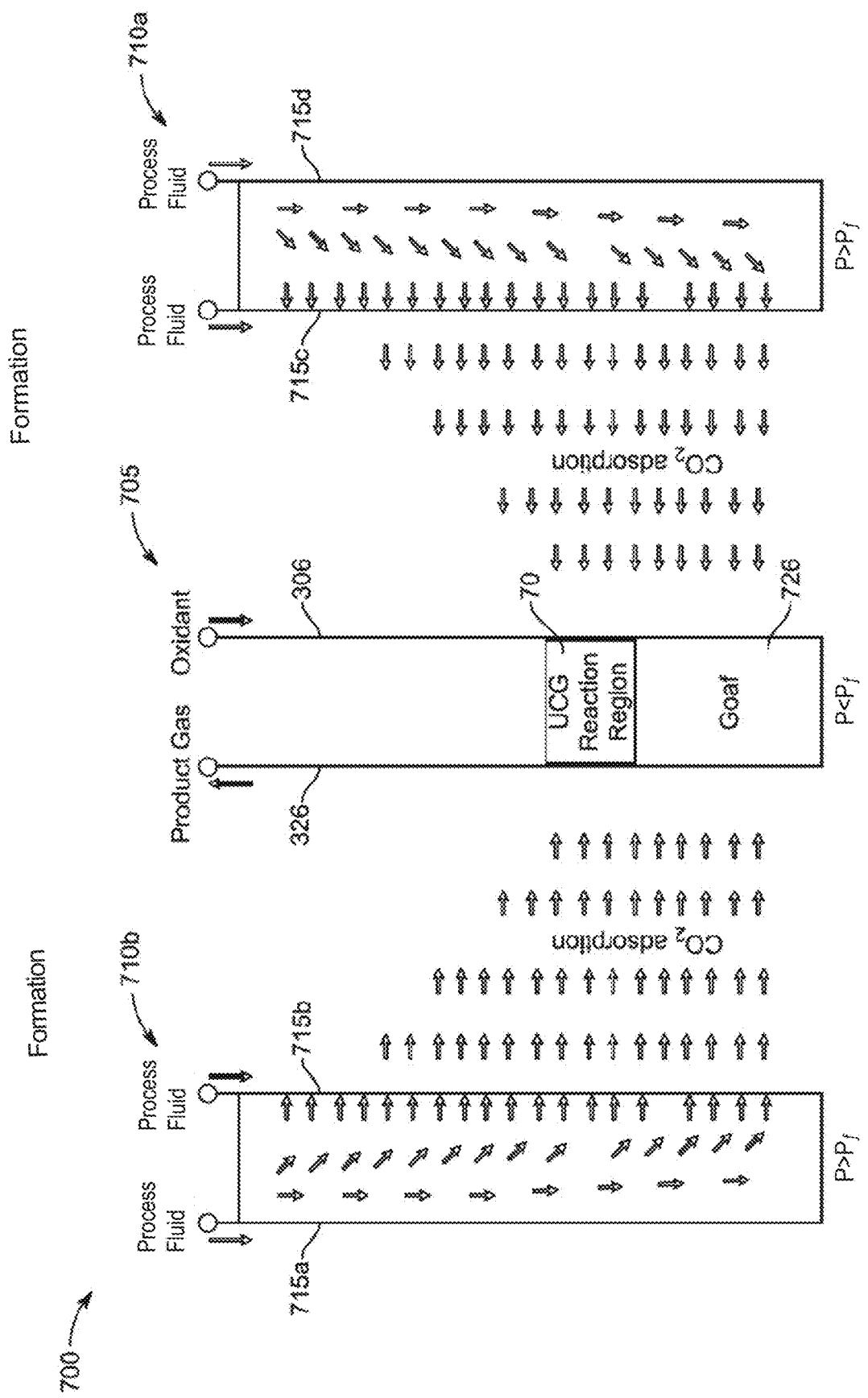
FIG. 7 is a schematic plan view of an underground carbonaceous formation including one or more depleted panels and an active panel, in accordance with embodiments of the present technology.

FIG. 7 is a schematic plan view of a UCF 700 including one or more depleted panels 710a/b (collectively referred to as "the depleted panels 710") and an active panel 705, in accordance with embodiments of the present technology. The UCF 700 can correspond to the system 400 and/or operations described with reference to FIG. 4, and the active panel 705 can correspond to the active panel 325 of FIG. 4. As shown in FIG. 7, the active panel 705 is positioned between the first depleted panel 710a and the second depleted panel 710b. The active panel 705 includes (i) the active panel injection conduit 306 that extends to an underground goaf area 726 and is configured to direct the oxidant to the UCG reaction region 70, and (ii) the production conduit 326 configured to direct the product gas from the UCG reaction region 70 to the surface. The first depleted panel 710a includes first depleted panel injection conduits 715c/d and the second depleted panel 710b includes second depleted panel injection conduits 715a/b, each of which is configured to direct a process fluid (e.g., the process fluid 311 or 314) to an area of the UCF 700. As previously described, the depleted panels 710a and 710b can have larger diameters or cross-sectional dimensions to provide less resistance relative to the conventional wells.

In operation, the relative arrangement of the active panel 705 and depleted panels 710 creates a pressure profile that causes the process fluid (e.g., injected carbon dioxide) to migrate from the depleted panels 710 toward the active panel 705. The active panel 705 operates at a pressure less than hydrostatic or formation fluid pressure (e.g., 0.5-100 barg, depending on the depth and formation pressure), which is less than the formation pressure (e.g., 20-280 barg) of the UCF 700. The operating pressure of the active panel 705 is controlled in part by the injection pressure, as well as by the flow rates of the oxidant and product gas. The depleted panels 710 receive the injected carbon dioxide-containing fluid at a pressure above the formation pressure. For example, as described herein, the injection pressure for the depleted panels 710 can approach (e.g., be within 5%, 10%, or 20% of) lithostatic pressure. The lithostatic pressure can be 25-300 barg depending on depth. For example, the lithostatic pressure can be 25-30 barg at a 100 m depth and 400 barg at a 1500 m depth. As such, the process fluid injected into the depleted panels 710 travels from the depleted panels 710 through the UCF 700 toward and/or to the active panel 705. By positioning the depleted panels 710 adjacent the active panel 705 and creating this pressure profile, the injected process fluid penetrates through a greater area of the UCF and thus enables, for example, carbon dioxide of the process fluid to be injected at the depleted panels 710. This helps to increase or maximize the amount of the UCF 700 that contacts and/or becomes saturated with the injected process fluid. If the depleted panels 710 were not positioned near the active panel 705, there would be less driving force between the depleted panels 710 and the active panel 705 and thus less penetration of the process fluid through the UCF. As another benefit, the pressure profile formed via the relative arrangement of the active panel 705 and the depleted panels 710 enables the operator to control the direction in which the injected carbon dioxide-containing fluid migrates. For example, as shown in FIG. 7, the injected process fluid migrates only or predominantly in a direction from the depleted panels 710 toward the active panel 705, and does not migrate from the depleted panels 710 away from the active panels 705.

Figure 8:
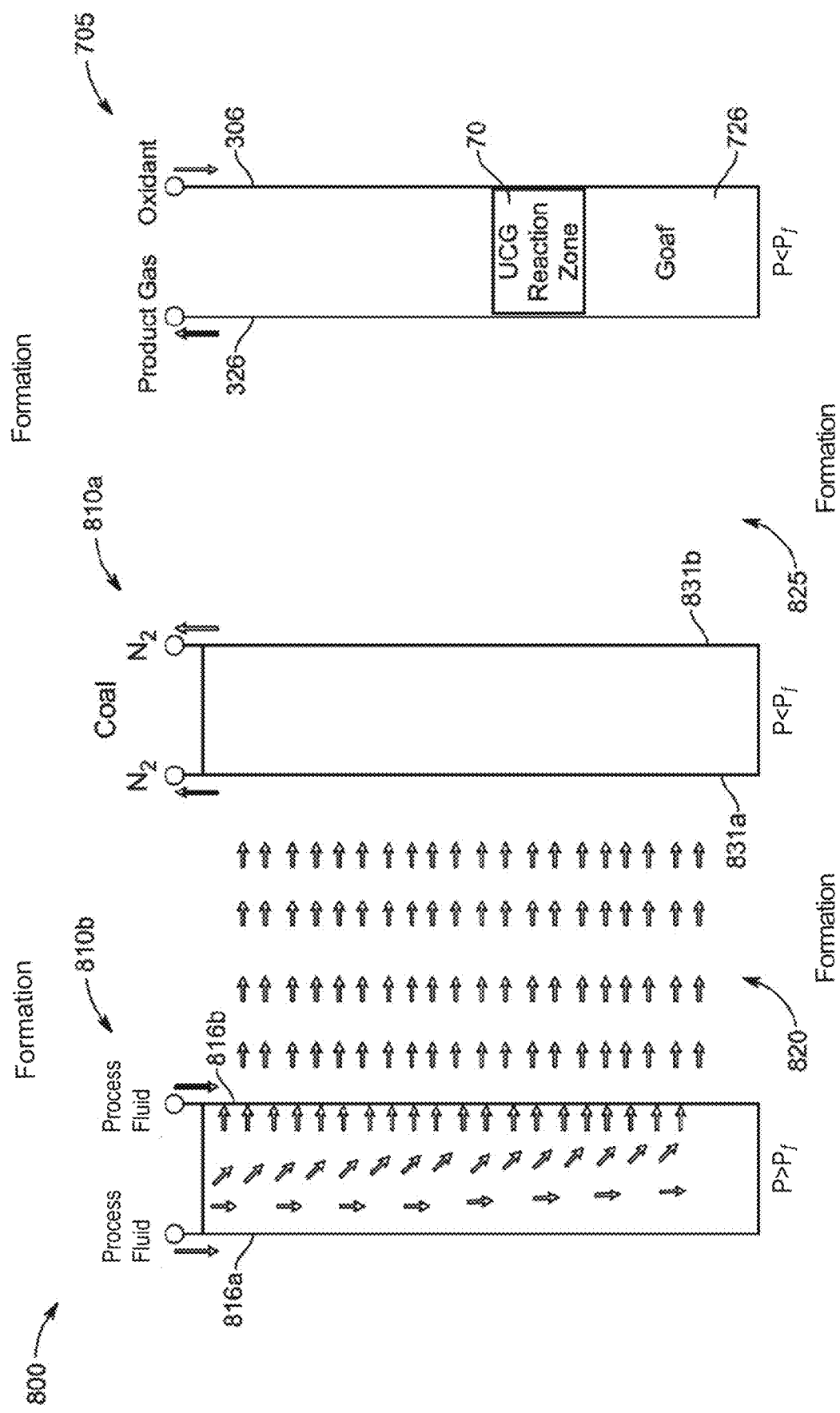
FIG. 8 is a schematic plan view of an underground carbonaceous formation including one or more depleted panels and an active panel, in accordance with embodiments of the present technology.

FIG. 8 is a schematic plan view of a UCF 800 including one or more depleted panels 810a/b (collectively referred to as "the depleted panels 810") and the active panel 705, in accordance with embodiments of the present technology. The UCF 800 can correspond to the system 600 and/or operations described with reference to FIG. 6, and the active panel 705 can correspond to the active panel 325 of FIG. 6. As shown in FIG. 8, the first depleted panel 810a is positioned between the active panel 705 and the second depleted panel 810b. The active panel 705 includes the active panel injection conduit 306 and the production conduit 326 previously described, and the second depleted panel 810b includes depleted panel injection conduits 816a/b (collectively referred to as "the depleted panel injection conduits 816") configured to inject a process fluid (e.g., the process fluid 311 or 314) into an area of the UCF 800. The first depleted panel 810a includes depleted panel production conduits 831a/b (collectively referred to as "the depleted panel production conduits 831") configured to withdraw nitrogen provided from the flue gas of the second depleted panel 810b. As previously described with reference to FIG. 6, the nitrogen-containing gas withdrawn from the depleted panel production conduits 831 can be recycled and injected into the UCF 800, e.g., via the depleted panel injection conduits 816 of the second depleted panel 810b.

In operation, the relative arrangement of the active panel 705 and the depleted panels 810 creates a pressure profile that causes injected carbon dioxide-containing fluid to migrate from the second depleted panel 810b toward the first depleted panel 810a. As described elsewhere herein, the active panel 705 operates at a pressure less than hydrostatic or formation fluid pressure, which is less than the formation pressure of the UCF 800, and the second depleted panel 810b operates at a pressure greater than the formation pressure. The first depleted panel 810a operates at a pressure less than the formation pressure due to the depleted panel production conduits 831 and withdrawal of the nitrogen-containing gas therein. As such, the first depleted panel 810a acts as a "low pressure zone" to help control the migration of injected process fluid within an area 820 of the UCF 800. As such, the UCF 800 has a pressure profile that drives the injected process fluid of the second depleted panel 810b toward the first depleted panel 810a, and enables the area 820 of the UCF between the second depleted panel 810b and the first depleted panel 810a to contact and/or be saturated with, for example, carbon dioxide of the injected process fluid.

Additional depleted panels can be formed to saturate additional areas of the UCF 800 with carbon dioxide and/or control migration of the injected gas in a desired direction. For example, once the volatile matter of the active panel 705 has been removed and/or production of a standard quality syngas therefrom can no longer be consistently sustained, the active panel 705 can become a new depleted panel that can be "quenched," as described with reference to FIG. 3, to clean and cool it, and can be maintained at a pressure lower than the formation fluid pressure. At that time, a new active panel can be created adjacent the new depleted panel and operated to generate syngas via the UCG process described herein. In doing so, the first depleted panel 810a can receive flue gas for sequestration, as previously described for the second depleted panel 810b; the new depleted panel (i.e., the previous active panel 705) can withdraw a nitrogen-containing gas, as previously described for the first depleted panel 810a; and the new active panel (not shown) can receive an oxidant and produce a product gas, as previously described for the active panel 705. In doing so, an area 825 of the UCF contacts and/or becomes saturated with carbon dioxide of the carbon dioxide-containing fluid. This process can be repeated as needed to sequester additional carbon dioxide.

Figure 9:
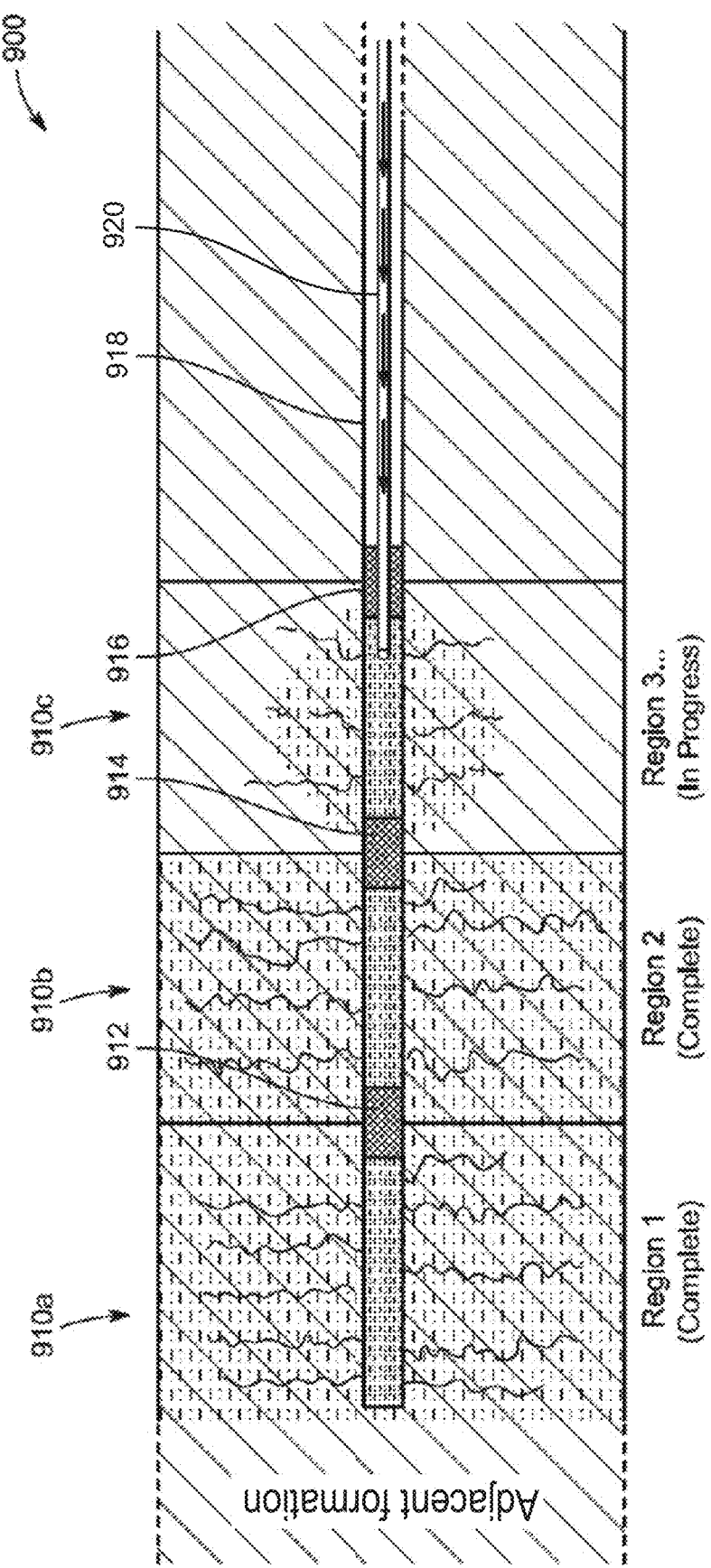
FIG. 9 is a schematic plan view of an injection well extending through multiple regions of an underground carbonaceous formation, in accordance with embodiments of the present technology.

FIG. 9 is a schematic plan view of an injection well 918 extending (e.g., laterally and/or horizontally) through multiple regions 910a/b/c (collectively referred to as "the regions 910") of a UCF 900, in accordance with embodiments of the present technology. This system can inject process fluid (e.g., the process fluid 311/314) into the UCF directly (e.g., not via a depleted panel). As shown in FIG. 9, the injection well 918 is drilled from the right to the left into region 1 of UCF 900. Initially, process fluid is injected into the region 910a, which is insulated to the left by a bottom (or end) of the injection well 918 and to the right by a packer 916, through which a carbon dioxide injection tube 920 passes. The injection is performed at pressure near lithostatic pressure until swelling due to carbon dioxide adsorption within the region 910a reduces the permeability and injectivity of carbon dioxide of the process fluid. The injection pressure can be sharply increased (i.e., formation permeability can be thus stimulated, as previously described), e.g., from formation fluid pressure to lithostatic pressure within a predetermined time period (e.g., no more than 30 minutes) to break through the swollen area into fresh UCF material. This cycle of injection and stimulation can be repeated until stimulation becomes ineffective in increasing carbon dioxide injectivity. At this point, a plug 912 can be disposed to block off region 910a. Afterward, the packer 916 is pulled toward the heel of the injection well 918 and placed in a position to insulate region 910b between the plug 912 and the packer 916. Injection into region 910b is performed in the same manner as described for region 910a. After injection into region 910b is completed, a plug 914 is set to block off region 910b. Process fluid injection is then shifted to region 910c by setting the packer 916 in the position shown in FIG. 9. At that point, as shown in FIG. 9, process fluid dissipation into region 910c begins. This process can continue to additional regions until the packer 916 reaches the heel of the injection well 918. Sequential injection of process fluid into consecutive isolated segments of regions 910 may be implemented, e.g., using different drilling and completion techniques and equipment. Such techniques and equipment may not include setting plugs and packers, but rather using other means for injection into the isolated regions.

Figure 10A:
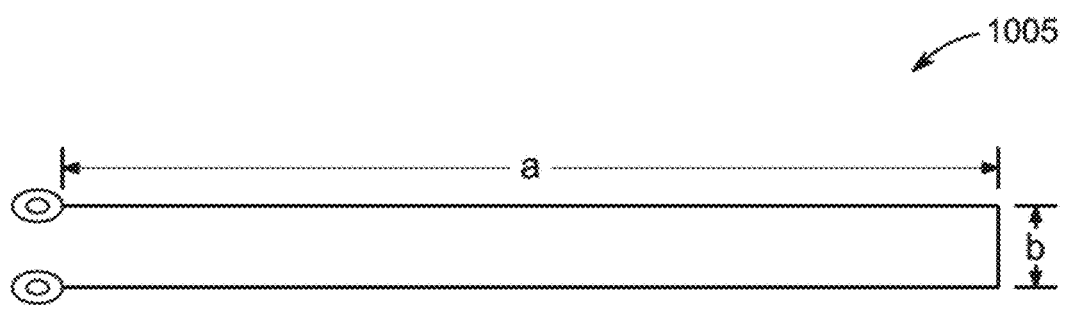
FIGS. 10A and 10B are schematic illustrations of panels formed by horizontal wells for underground coal gasification and/or carbon sequestration, in accordance with embodiments of the present technology.
Figure 10B:
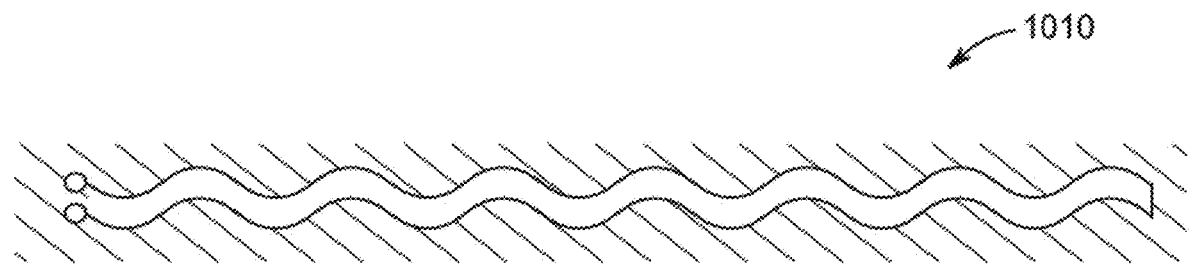

IV. Horizontal Wells for Use in Underground Carbonaceous Formations and Associated Systems and Methods As described herein, e.g., with reference to FIG. 5, conduits typically extend vertically from a ground surface to access a UCF below. However, in some embodiments UCFs may not be accessible via a vertical well or conduit, and can only be accessed via horizontal wells. This is, for example, the case for UCFs located offshore or beneath protected areas (e.g., national parks) where drilling a well from above the UCF is not possible. In view of such UCFs, FIGS. 10A and 10B are schematic illustrations of UCG panels formed by drilling horizontal wells or panels 1005, 1010 that can be utilized for UCG, carbon sequestration, or other uses, in accordance with embodiments of the present technology.

It is generally preferred to maximize the surface area of a UCG panel in contact with the surrounding UCF since the panel's utility as a conduit for injection of process fluid or carbon dioxide-containing fluid is determined in part by its cross-section, which should ensure its low hydraulic resistance, and the surface area of contact with UCF. As such, embodiments of the present technology include panels that are relatively long along a length dimension (a) and relatively narrow along a width dimension (b), as shown in FIG. 10A as the surface area of contact with the UCF is proportional to $(a/b)^{1/2}$. As shown in FIG. 10B, the panel 1010 can include a curved surface and/or sinusoidal shape to further increase the surface area of the panel in contact with the surrounding UCF. Without being bound by theory, the curved surface of the panel 1010 can increase contact with the surrounding UCF by at least 20%, 30%, 40%, or 50%, relative to the panel 1005 without curved surfaces. In doing so, embodiments of the present technology have more contact with carbonaceous formations, which enables more carbon to be sequestered, among other benefits.

Figure 11:
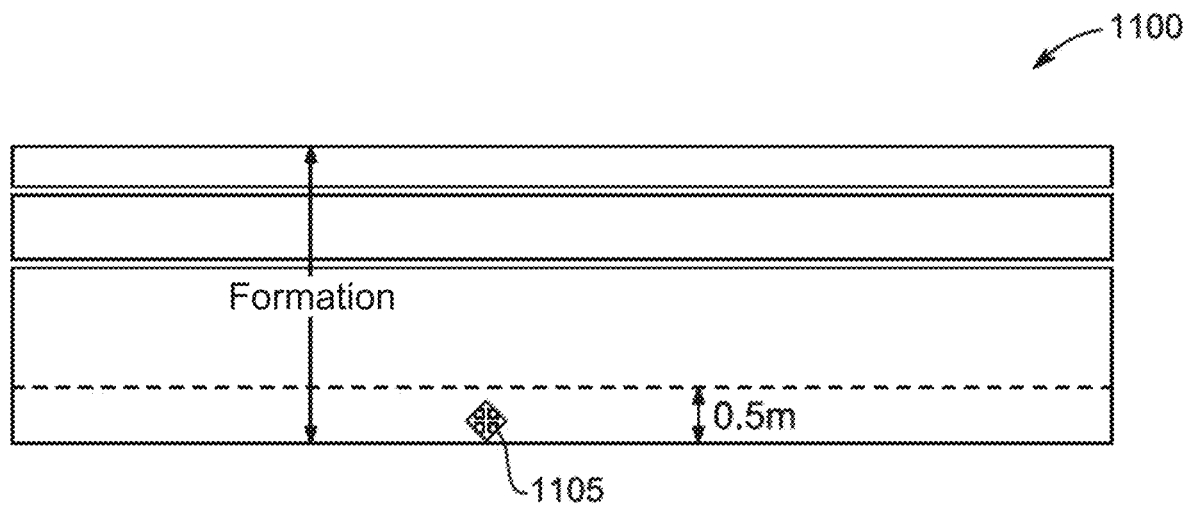
FIG. 11 is a schematic illustration of an underground carbonaceous formation including a process fluid injection point at a bottom portion of the carbonaceous formation, in accordance with embodiments of the present technology.

V. Injecting Carbon Dioxide-Containing Fluids into Underground Carbonaceous Formations and Associated Systems and Methods FIG. 11 is a schematic illustration of a UCF 1100 including a process fluid (e.g., the process fluid 311 or 314) injection site 1105 at a bottom portion of the UCF, in accordance with embodiments of the present technology. As described herein, injection in the UCF preferably increases (e.g., maximizes) (i) contact between the process fluid and the UCF and (ii) saturation of the UCF by the process fluid. The UCF is normally saturated by formation fluids including groundwater, hydrocarbons, and hydrogen sulfide. The formation fluids typically occupy the formation matrix pore space and are adsorbed to the matrix material of the UCF. For the process fluid to displace the formation fluids, injection should typically occur at a bottom portion of the UCF but above a UCF floor, which comprises rocks that are generally less permeable than the UCF. For example, injection can be at the bottom 0.5 m of the formation thickness as shown in FIG. 11. In doing so, the buoyancy of the process fluid, the density of which is less than that of the formation fluids, can promote more saturation within the UCF by rising therethrough and displacing formation fluids from pore space.

Figure 12:
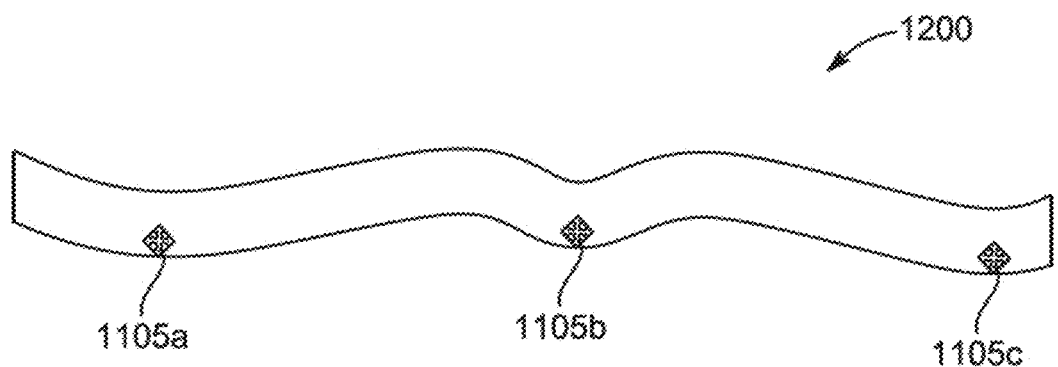
FIG. 12 is a schematic illustration of an underground carbonaceous formation including process fluid injection points at bottom portions of the carbonaceous formation, in accordance with embodiments of the present technology.

This same principle can be applied across a lateral distance of a UCF, as shown in FIG. 12, which is a schematic illustration of a UCF 1200 including process fluid injection sites 1105a/b/c (collectively referred to as "the injection sites 1105") at bottom portions of the UCF 1200. As shown in FIG. 12, the UCF 1200 has undulations which result in multiple low elevation points across a lateral distance of the UCF 1200. Having the injection sites 1105 at the lowest elevations of the UCF 1200, and above a floor of the UCF 1200, promotes more saturation of the UCF 1200 by the process fluid.

Figure 13:
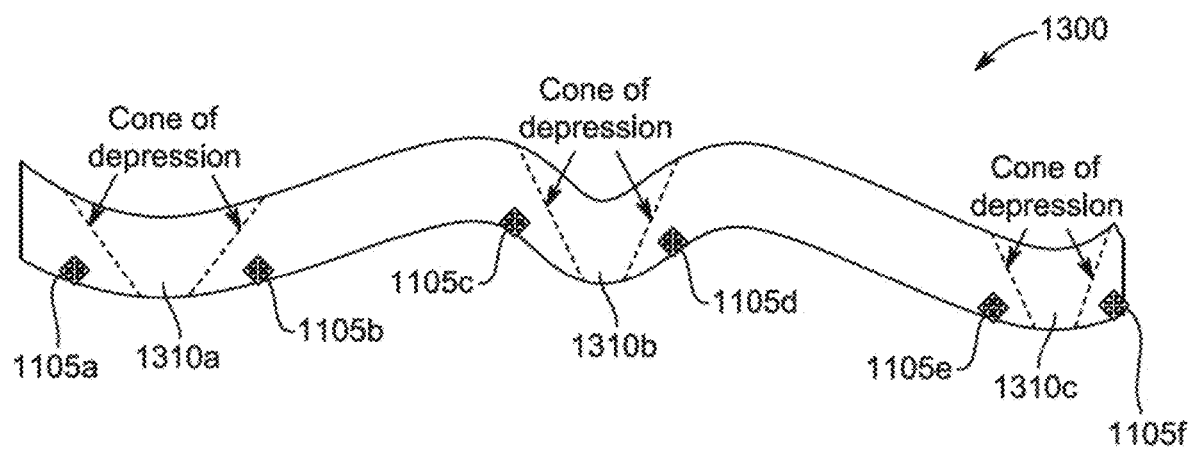
FIG. 13 is a schematic illustration of an underground carbonaceous formation including low pressure zones and process fluid injection points at bottom portions of the carbonaceous formation, in accordance with embodiments of the present technology.

As described elsewhere herein, the locations of the injections can form pressure profiles that drive migration of fluid injected to the UCF. FIG. 13 illustrates an example of this, and is a schematic view of a UCF 1300 including low pressure zones 1310a/b/c (collectively referred to as "the low pressure zones 1310") between process fluid injection sites 1105*a/b/c/d/e/f* (collectively referred to as "the injection sites 1105") at bottom portions of the UCF 1300. The injection sites 1105 can each receive the process fluid injected at pressures higher than the surrounding formation pressure of the UCF. Low pressure zones 1310 can be formed at areas adjacent the injection sites 1105, e.g., between adjacent injection sites 1105*a/b*, 1105*c/d*, 1105*e/f*, as shown in FIG. 13. The low pressure zones can comprise one or more conduits, such as the depleted panel production conduits described herein that withdraw nitrogen or other fluid from that area. As a result of withdrawing nitrogen or other fluids, the pressure of these areas is lower than the formation pressure, which is lower than the pressure at the injection sites 1105. A "cone of depression" is formed at the low pressure zone 1310*b* of the UCF 1300, and, in operation, the pressure profile of the UCF 1300 causes the injected process fluids to migrate predominantly from the injection sites 1105 to the corresponding low pressure zones 1310. Over time, the injected process fluid first fills the lower pressure areas (i.e., the lower elevation areas) of the UCF 1300 and then fills the higher pressure areas (i.e., the higher elevation areas) of the UCF 1300, such that the entire UCF 1300 is eventually saturated with the process fluid.

Figure 14:
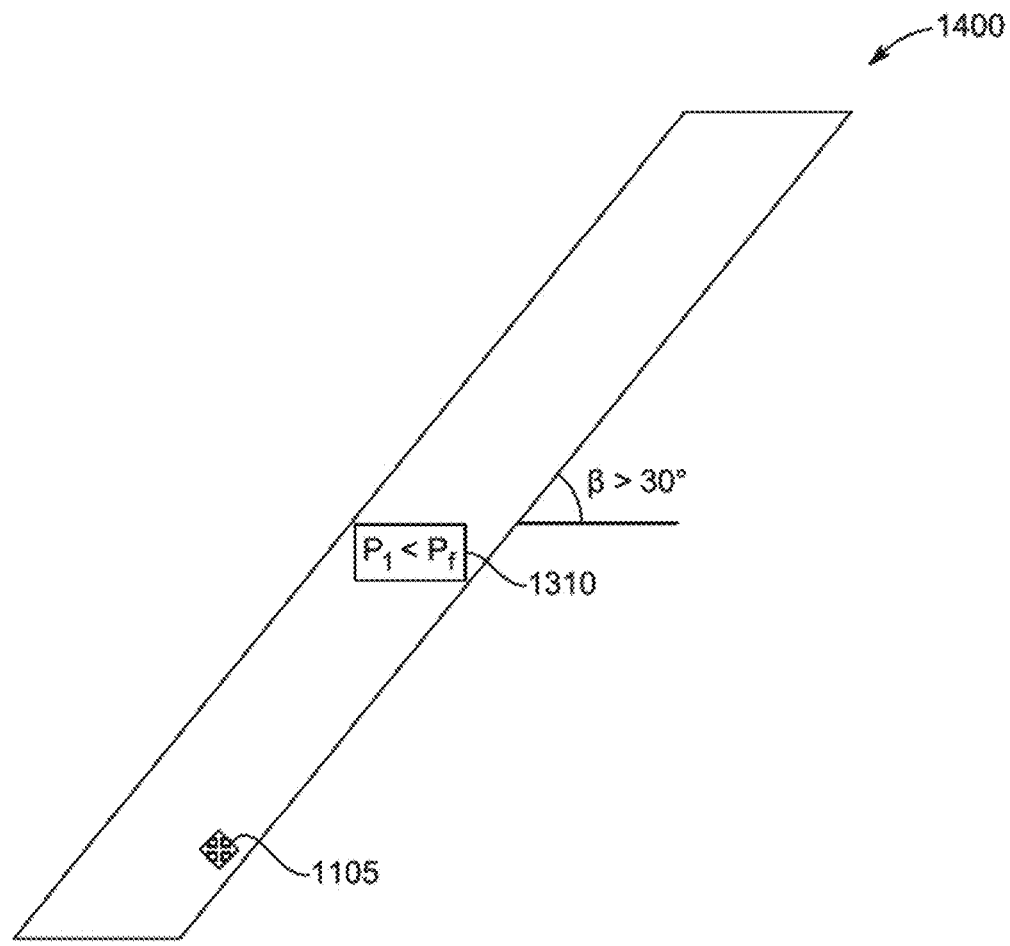
FIG. 14 is a schematic illustration of a vertically angled underground carbonaceous formation including a process fluid injection to bottom portions of the carbonaceous formation, in accordance with embodiments of the present technology.

In some embodiments, formations will have steep dips, e.g., with angles (β) exceeding 30°. FIG. 14, for example, is a schematic illustration of a vertically angled UCF 1400 including a process fluid injection site 1105. For such embodiments, positioning the injection site 1105 within the cone of depression is difficult, and thus the injection site 1105 is located at a lowest accessible elevation of the formation floor.

Figure 15:
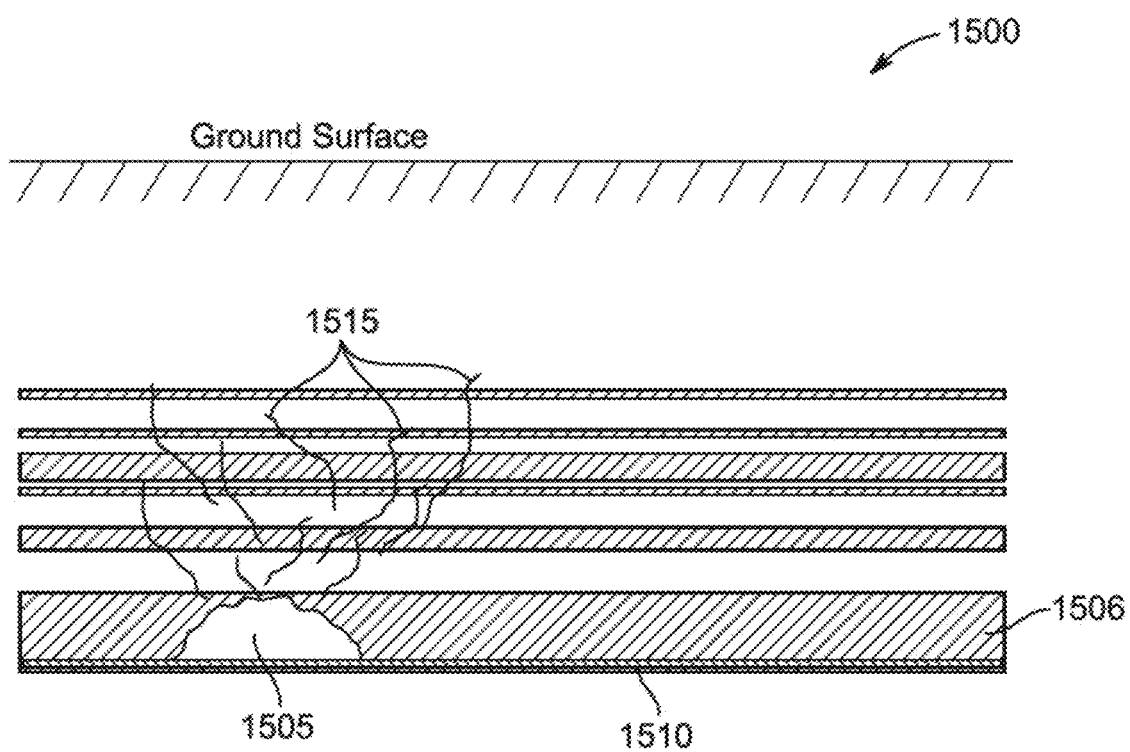
FIG. 15 is a schematic illustration of an underground carbonaceous formation including an underground coal gasification cavity, a process well, and induced fractures from the underground coal gasification cavity, in accordance with embodiments of the present technology.

VI. Interconnecting Beds of Underground Carbonaceous Formations and Associated Systems and Methods Most UCFs occur as a series of carbonaceous material beds intercalated by inert rock. Unless the UCFs are sufficiently shallow for surface mining, any voids or undersaturated zones can be created only by mining, drilling, or UCG. There is rarely more than one carbonaceous bed within the series that is thick enough to be mined or targeted by UCG, and as such these thin UCFs are not typically utilized. FIG. 15, which illustrates a UCF 1500 including a UCG cavity 1505, a process well 1510, and induced fractures 1515 from the UCG cavity 1505, shows one such example of this. As shown in FIG. 15, the thickest bed 1506 of the UCF 1500 is the lowest elevation bed in the series. The bottom thick bed 1506 should be mined or gasified so that the upper carbonaceous bed(s) are undermined and the resulting deformation fractures above it hydraulically interconnect the carbonaceous beds of the UCF 1500 above the bottom thick bed 1506. After the mining operations or UCG process is completed, injection of process fluids into the depleted workings or UCG panel of the UCF 1500 can sequester the process fluids in all the carbonaceous beds of the UCF 1500. As a result, more carbonaceous material becomes available for sequestration than is suitable for mining or UCG process.

Figure 16:
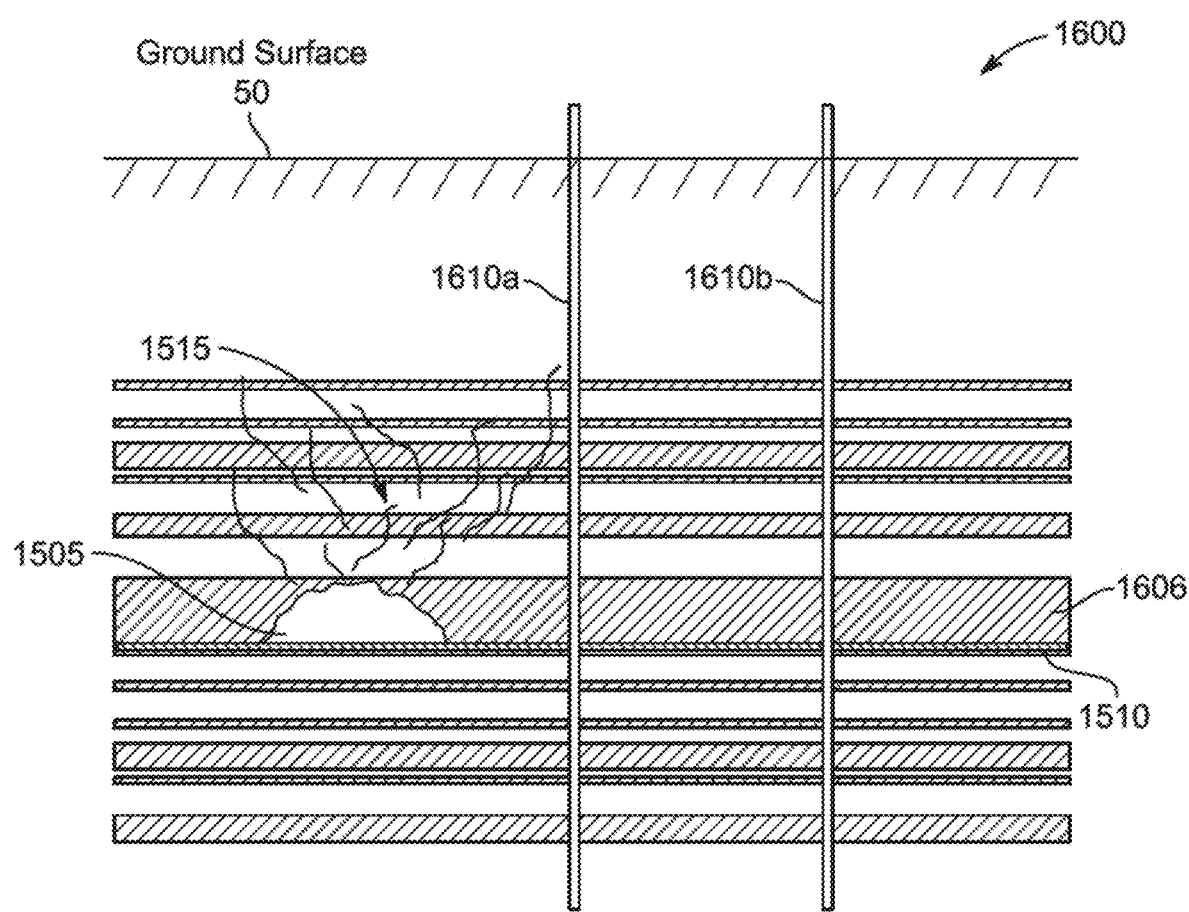
FIG. 16 is a schematic illustration of vertical conduits extending through an underground carbonaceous formation, in accordance with embodiments of the present technology.
Figure 17:
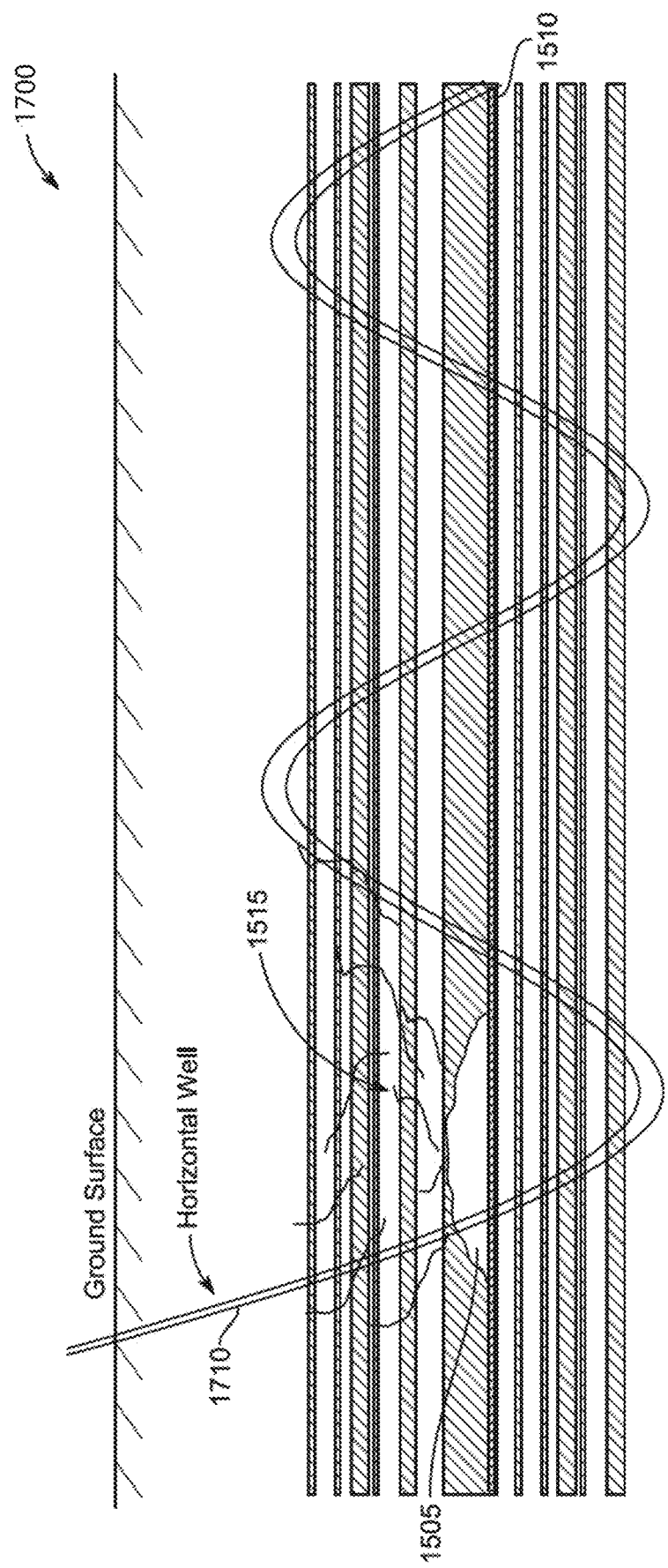
FIG. 17 is a schematic illustration of a conduit extending through an underground carbonaceous formation, in accordance with embodiments of the present technology.

As shown in FIGS. 16 and 17, in some embodiments the minable or suitable bed for UCG is located in the middle of the UCF. As shown in FIG. 16, the beds of the UCF 1600 can be interconnected by vertically drilling wells 1610*a/b* from the surface 50 through each and every bed 1606 of the UCF 1600. The wells 1610*a/b* can be drilled following completion of the mining or UCG process. Since the wells can provide access to the series of beds from the surface 50, the wells 1610*a/b* can be used for injection of process fluids or as production conduits for creation of low pressure zones, as described elsewhere herein.

The interconnection of the UCF 1600 can also be achieved by drilling a well that has horizontal and vertical components. An example of this is shown in FIG. 17, which includes a well 1710 extending horizontally and vertically through each of the beds of the UCF 1700. The well 1710 can remain open throughout the UCF 1700, and can be used for injection of process fluids or as production conduits for creation of low pressure zones, as described elsewhere herein. In some embodiments, a directional horizontal well may be a more cost-effective alternative for interconnecting a series UCF over a large lateral extent than the multiple vertical wells shown in FIG. 16.

VII. Matrix for Sequestration of Carbon Dioxide-Containing Fluids in UCF

Figure 18:
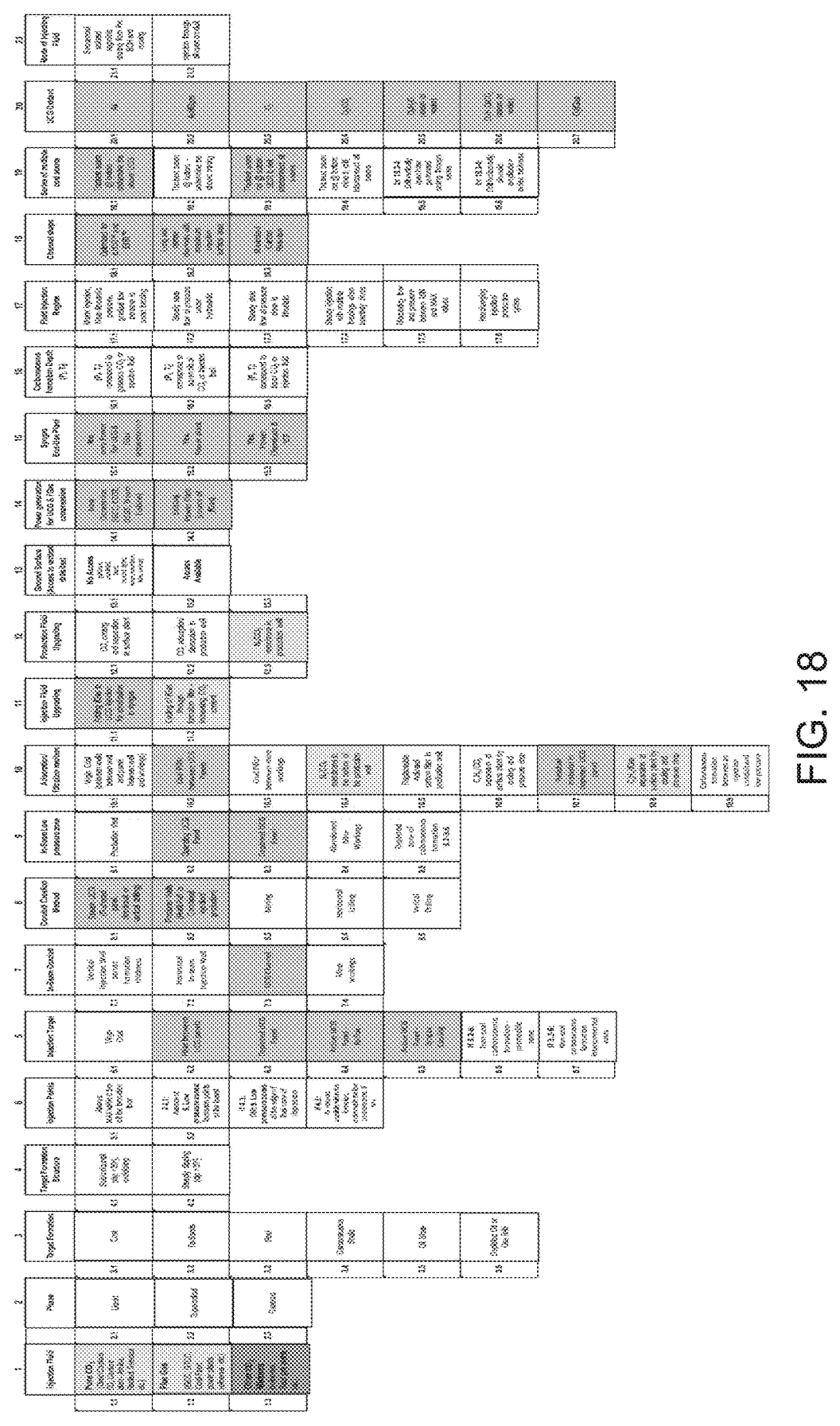

FIG. 18 illustrates a matrix of multiple categories that characterize methods and systems for effective and scalable sequestration of process fluids in UCF. Each category includes multiple options for implementing sequestration processes, permutations of which can be matched to construct a variant of sequestration methods and systems optimal for a specific set of conditions. The categories include the type of process fluid and its phase state, types of carbonaceous formations and their structure and depth, injection targets within the UCF and location of injection points, the kinds of injection conduits that can be built within the UCFs and the methods for construction of these conduits, the types of low pressure zones and adsorption and filtration media within UCFs, methods for upgrading production fluids for enhanced carbon sequestration, options for construction and operation of process fluid sequestration systems offshore and under inaccessible areas, fluid injection regimes and systems for implementing them, and parameters of UCG systems suitable for various conditions of sequestration.

VIII. Conclusion

It will be apparent to those having skill in the art that changes may be made to the details of the above-described embodiments without departing from the underlying principles of the present disclosure. In some cases, well-known structures and functions have not been shown or described in detail to avoid unnecessarily obscuring the description of the embodiments of the present technology. For example, valves, conduits, controllers, and other features have been omitted from descriptions of some of the present technology. Although steps of methods may be presented herein in a particular order, other embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. The term "and/or" when used in reference to a list of two or more item is to be interpreted as including (a) any single item in the list, (b) all of the items in the list, and (c) any combination of the items in the list. Additionally, the terms "comprising," "including," and "having" should be interpreted to mean including at least the recited feature(s) such that any greater number of the same feature and/or additional types of other features are not precluded.

Reference herein to "one embodiment," "an embodiment," "some embodiments," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing numerical values (e.g., pressures, temperatures, etc.) used in the specification and claims are to be understood as being modified in all instances by the term "about" or "approximately." The terms "about" and "approximately," when used in reference to a value, are to be interpreted to mean within 10% of the stated value. Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

1. A system for using an underground carbonaceous formation, the system comprising:
   a source of process fluid comprising at least one of (i) at least 90% carbon dioxide, (ii) nitrogen, or (iii) steam;
   an injection well fluidically coupled to the source of process fluid and extending from a ground surface to an underground region including contaminants, wherein volatile matter has been at least partially removed from the underground region; and
   a production well extending from the underground region toward the ground surface;
   wherein, in operation, the process fluid cools the underground region.
2. The system of any one of the clauses herein, wherein the process fluid comprises pure carbon dioxide.
3. The system of clause 2, wherein, in operation, after cooling the underground region, the process fluid displaces at least some of the contaminants from the underground region.
4. The system of any one of the clauses herein, further comprising a compressor above the ground surface, wherein an inlet of the compressor is fluidically coupled to the production well and an outlet of the compressor is fluidically coupled to the injection well.
5. The system of clause 4, further comprising a separator unit between the production well and the inlet of the compressor, wherein the separator unit is configured to separate syngas from the process fluid traveling through the production well.
6. The system of any one of the clauses herein, wherein, in operation, the process fluid is directed from the underground region to the ground surface via the production well, and wherein at least a portion of the process fluid directed toward the ground surface via the production well is recirculated to the underground region via the injection well.
7. A system for sequestering carbon within an underground carbonaceous formation and/or quenching an underground carbonaceous formation with carbon, the system comprising:
   an injection conduit extending to a first underground region of a carbonaceous formation, wherein the injection conduit is configured to be fluidically coupled to a source of oxidant, and wherein the first underground region has a first hydraulic resistance;
   a production conduit spaced apart from the injection conduit and extending from the first underground region toward a ground surface; and
   an injection well fluidically coupled to a source of process fluid and extending toward a second underground region of the carbonaceous formation, wherein the process fluid comprises carbon dioxide, and wherein:
   the second underground region has a second hydraulic resistance,
   the second underground region is laterally spaced apart from the first underground region by an adjacent formation having a third hydraulic resistance higher than the first hydraulic resistance and the second hydraulic resistance, and
   the second underground region includes contaminants.
8. The system of any one of the clauses herein, wherein, in operation:
   the adjacent formation has a fluid pressure,
   the first underground region has a first pressure below the fluid pressure of the adjacent formation, and
   the second underground region has a second pressure above the fluid pressure of the adjacent formation.

9. The system of clause 8, wherein the first pressure (i) is lower than the second pressure, (ii) is less than an injection pressure of the injection conduit, and (iii) is at least 20 barg.
10. The system of clause 8, wherein the first underground region includes an active panel and the second underground region includes a depleted panel, and wherein the first pressure of the first underground region is less than the second pressure of the second underground region such that, in operation, at least a portion of the process fluid injected via the injection well migrates through the adjacent formation of the carbonaceous formation from the second underground region toward the first underground region.
11. The system of any one of the clauses herein, wherein the carbonaceous formation is at a lithostatic pressure of at least 15 barg, and wherein the injection well is configured to deliver the process fluid to the second underground region at an injection pressure within 30% of the lithostatic pressure.
12. The system of clause 11, wherein the injection pressure is above a fluid pressure of the adjacent formation.
13. The system of any one of the clauses herein, further comprising a power plant fluidically coupled to the first underground region via the production well, such that the power plant is configured to receive a product gas.
14. The system of any one of the clauses herein, wherein the second underground region includes a depleted panel having a cross-sectional dimension of at least 0.5 meters.
15. The system of any one of the clauses herein, wherein the process fluid comprises at least one of a flue gas or a gas stream comprising less than 30% carbon dioxide.
16. The system of clause 15, further comprising a production well extending from the second underground region toward the ground surface, wherein the injection well is configured to receive a gas stream comprising a first amount of carbon dioxide and the production well is configured to receive at least a portion of the gas stream comprising a second amount of carbon dioxide less than the first amount of carbon dioxide.
17. The system of any one of the clauses herein, further comprising a production well extending from the second underground region toward the ground surface, wherein the production well is configured to receive a gas stream comprising carbon dioxide from the second underground region, and wherein, in operation, at least some of the carbon dioxide of the gas stream received by the production well is recirculated via the production well to the injection well.
18. The system of any one of the clauses herein, wherein a portion of the injection well is fluidically coupled to the injection conduit such that, in operation, the process fluid is provided to the first underground region via the injection conduit.
19. The system of clause 18, further comprising a segregation system including an activated carbon filter and/or a membrane, wherein the segregation system is positioned to segregate carbon dioxide and nitrogen.
20. The system of any one of the clauses herein, wherein the process fluid is at least one of pure carbon dioxide or a gas stream comprising at least 90% carbon dioxide.
21. The system of any one of the clauses herein, wherein the adjacent formation is a first adjacent formation on a first side of the second underground region, the system further comprising a second adjacent formation on a second side of the second underground region opposite the first side, wherein the second adjacent formation is fluidically coupled to the injection conduit.
22. The system of any one of the clauses herein, wherein the process fluid is at least one of pure carbon dioxide or a gas stream comprising at least 90% carbon dioxide, and wherein a portion of the injection well is fluidically coupled to the injection conduit such that, in operation, the process fluid is provided to the first underground region via the injection conduit.
23. The system of any one of the clauses herein, wherein the process fluid is at least one of pure carbon dioxide or at least 90% carbon dioxide, the system further comprising a production well extending from the second underground region toward the ground surface and configured to receive a gas stream comprising carbon dioxide from the second underground region, wherein, in operation, at least some of the carbon dioxide of the gas stream received by the production well is recirculated via the production well to the injection well.
24. The system of any one of the clauses herein, wherein the first underground region supports a reaction with the oxidant in which a product gas comprising hydrogen is produced.
25. The system of any one of the clauses herein, wherein, in operation, the process fluid injected via the injection well cools the second underground region and displaces at least some of the contaminants from the second underground region.
26. A method for sequestering carbon within an underground carbonaceous formation and/or quenching an underground carbonaceous formation with carbon, the method comprising:
extracting, via a production conduit, a product gas from a first underground region of a carbonaceous formation, wherein the first underground region supports a reaction with an oxidant in which a product gas comprising hydrogen is produced; and
injecting, via an injection well, a process fluid comprising carbon to a second underground region of the carbonaceous formation, wherein volatile matter has been removed from the second underground region, and wherein the second underground region is spaced laterally apart from the first underground region by an adjacent formation.
27. The method of any one of the clauses herein, wherein injecting the process fluid comprises injecting the process fluid at a pressure of at least 10 barg and/or a flow rate of at least 5 tonnes per hour.
28. The method of any one of the clauses herein, wherein injecting the process fluid comprises (i) injecting the process fluid at a first pressure of at least 20 barg, and (ii) after injecting at the first pressure, injecting the process fluid at a second pressure of no more than 5 barg.
29. The method of clause 28, further comprising, after injecting the process fluid at the second pressure, injecting the process fluid at a third pressure higher than the second pressure.
30. The method of any one of the clauses herein, wherein the carbonaceous formation is at a lithostatic pressure of at least 15 barg, and wherein injecting the process fluid comprises injecting carbon dioxide to the second underground region at an injection pressure less than and within 30% of the lithostatic pressure.
31. The method of any one of the clauses herein, wherein injecting the process fluid comprises increasing a pressure of the process fluid from an initial pressure to at least 25 barg over a time period of no more than 60 minutes.

32. The method of any one of the clauses herein, wherein:
the adjacent formation is a first adjacent formation on a first side of the second underground region,
the carbonaceous formation further comprises a second adjacent formation on a second side of the second underground region opposite the first side, and
the second adjacent formation has a hydraulic resistance higher than that of the first underground region and the second underground region.

33. The method of any one of the clauses herein, wherein the first underground region has a first hydraulic resistance, the second underground region has a second hydraulic resistance, and the adjacent formation has a third hydraulic resistance greater than the first hydraulic resistance and the second hydraulic resistance.

34. The method of any one of the clauses herein, wherein the process fluid comprises flue gas or at least 90% carbon dioxide.

I claim:

1. A system for cleaning and/or cooling a void in an underground carbonaceous formation, the system comprising:
a source of process fluid comprising at least one of (i) at least 90% carbon dioxide, (ii) flue gas, (iii) nitrogen, or (iv) steam;
an injection well fluidically coupled to the source of process fluid and extending from a ground surface to an empty void in an underground region of the underground carbonaceous formation, wherein the empty void includes contaminants and was formed by removal of carbon-containing matter; and
a production well extending from the underground region toward the ground surface;
wherein, in operation, the process fluid cools the empty void of the underground region.

2. The system of claim 1, wherein the process fluid comprises pure carbon dioxide.

3. The system of claim 2, wherein, in operation, after cooling the underground region, the process fluid displaces at least some of the contaminants from the underground region.

4. The system of claim 1, further comprising a compressor above the ground surface, wherein an inlet of the compressor is fluidically coupled to the production well and an outlet of the compressor is fluidically coupled to the injection well.

5. The system of claim 4, further comprising a separator unit between the production well and the inlet of the compressor, wherein the separator unit is configured to separate syngas from the process fluid traveling through the production well.

6. The system of claim 1, wherein, in operation, the process fluid is directed from the underground region to the ground surface via the production well, and wherein at least a portion of the process fluid directed toward the ground surface via the production well is recirculated to the underground region via the injection well.

7. The system of claim 1, wherein the process fluid comprises supercritical carbon dioxide.

8. The system of claim 1, wherein the empty void extends through the underground region between a first area beneath the production well and a second area beneath the injection well.

9. A method for using an underground carbonaceous formation, the method comprising:
forming an empty void in an underground region of the underground carbonaceous formation by removing carbon-containing matter from the underground region, wherein the empty void includes contaminants;
providing a process fluid comprising at least one of (i) at least 90% carbon dioxide, (ii) flue gas, (iii) nitrogen, or (iv) steam; and
cooling the underground region by (i) directing the process fluid from a ground surface to the empty void of the underground region via an injection well, and (ii) directing the process fluid from the underground region toward the ground surface via a production well.

10. The method of claim 9, wherein cooling the underground region comprises recirculating the process fluid between the ground surface and the underground region via the injection well and the production well.

11. The method of claim 9, wherein cooling the underground region comprises displacing at least some of the contaminants of the underground region.

12. The method of claim 9, further comprising:
receiving the process fluid at an inlet of a compressor fluidically coupled to the production well;
compressing the process fluid received from the production conduit to produce a compressed process fluid; and
directing the compressed fluid to an inlet of the injection well fluidically coupled to an outlet of the compressor.

13. The method of claim 9, wherein the process fluid comprises pure carbon dioxide.

14. The method of claim 9, further comprising, prior to directing the process fluid to the underground region, removing at least some of the volatile matter of the underground region.

15. The method of claim 9, wherein the process fluid comprises supercritical carbon dioxide.

16. A system for cleaning and/or cooling a void in an underground carbonaceous formation, the system comprising:
a source of process fluid comprising at least one of (i) at least 90% carbon dioxide, (ii) flue gas, (iii) nitrogen, or (iv) steam;
an injection well fluidically coupled to the source of process fluid and extending from a ground surface to an underground region of the underground carbonaceous formation, wherein an empty void of the underground region includes contaminants and was formed by removal of carbon-containing matter; and
a production well extending from the underground region toward the ground surface;
wherein the empty void extends through the underground region between a first area beneath the production well and a second area beneath the injection well.

* * * * *